US011674584B2

(12) United States Patent
Pallini et al.

(10) Patent No.: US 11,674,584 B2
(45) Date of Patent: Jun. 13, 2023

(54) MAINTENANCE FREE EXTENDED LIFE CAM FOLLOWER FOR A NECKER MACHINE

(71) Applicant: Roller Bearing Company of America, Inc., Oxford, CT (US)

(72) Inventors: Robert Pallini, Cheltenham, PA (US); Michael Coppola, Prospect, CT (US); Giovanni C. Albini, Watertown, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 188 days.

(21) Appl. No.: 17/190,012

(22) Filed: Mar. 2, 2021

(65) Prior Publication Data

US 2021/0180673 A1 Jun. 17, 2021

Related U.S. Application Data

(63) Continuation-in-part of application No. 16/684,827, filed on Nov. 15, 2019, now abandoned.

(Continued)

(51) Int. Cl.
*F16H 53/06* (2006.01)
*F16C 13/00* (2006.01)
(Continued)

(52) U.S. Cl.
CPC ............. *F16H 53/06* (2013.01); *B23Q 5/342* (2013.01); *F16C 13/006* (2013.01); *F16C 19/28* (2013.01); *F16C 33/605* (2013.01)

(58) Field of Classification Search
CPC ......... F16H 53/06; F16H 53/08; B23Q 5/342; F16C 35/06; F16C 35/061; F16C 35/063; F16C 13/006; F16C 19/28; F16C 33/605
See application file for complete search history.

(56) References Cited

U.S. PATENT DOCUMENTS 2,686,698 A 8/1954 Moore
3,266,856 A 8/1966 Steinert et al.
(Continued)

FOREIGN PATENT DOCUMENTS

DE 19529042 A1 2/2017
DE 102015220052 A1 * 4/2017
(Continued)

OTHER PUBLICATIONS

Machine Translation of DE-102015220052-A1.*
(Continued)

*Primary Examiner* — Brian J McGovern
(74) *Attorney, Agent, or Firm* — Robinson & Cole LLP

(57) ABSTRACT

An axial retainment system for a shaft is provided. The axial retainment system includes a cylindrical body extending from an outboard end to an inboard end thereof, and a swaged ridge extending radially outward from the cylindrical body proximate the outboard end. The swaged ridge has an outboard axial surface facing toward the outboard end and extending radially outward and terminating at a radially outward facing circumferential surface. The swaged ridge has an inboard axial surface facing toward the inboard end and extending radially outward from the cylindrical body and terminating at the radially outward facing circumferential surface. The outboard axial surface of the swaged ridge is recessed axially inward from the outboard end of the shaft. The inboard axial surface of the swaged ridge is swaged against, conforms in shape to, and is compressed against a component to be axially retained on the shaft.

51 Claims, 20 Drawing Sheets

Related U.S. Application Data

(60) Provisional application No. 62/824,548, filed on Mar. 27, 2019, provisional application No. 62/823,165, filed on Mar. 25, 2019, provisional application No. 62/768,323, filed on Nov. 16, 2018.

(51) Int. Cl.
*B23Q 5/34* (2006.01)
*F16C 33/60* (2006.01)
*F16C 19/28* (2006.01)

(56) References Cited

U.S. PATENT DOCUMENTS

| | | | |
|---|---|---|---|
| 3,889,983 A | 6/1975 | Freize et al. | |
| 4,138,168 A | 2/1979 | Herlitzek | |
| 4,817,995 A | 4/1989 | Deubler et al. | |
| 5,061,090 A * | 10/1991 | Kriaski | F16C 35/063 384/537 |
| 5,414,784 A * | 5/1995 | Schulte | F16C 19/183 384/537 |
| 5,531,137 A | 7/1996 | Guilford | |
| 6,267,510 B1 | 7/2001 | Herber et al. | |
| 6,280,097 B1 | 8/2001 | Mues et al. | |
| 7,234,873 B2 | 6/2007 | Kato et al. | |
| 8,104,779 B2 | 1/2012 | Gyuriesko et al. | |
| 9,482,332 B2 | 11/2016 | Shibutani et al. | |
| 10,274,013 B2 | 4/2019 | Pallini et al. | |
| 2008/0011119 A1 | 1/2008 | Bartosch | |
| 2009/0268998 A1 * | 10/2009 | Fujimura | F16C 33/60 384/537 |
| 2010/0196171 A1 | 8/2010 | Varnoux et al. | |
| 2011/0147332 A1 * | 6/2011 | Breyer | B65G 45/00 212/346 |
| 2012/0111141 A1 * | 5/2012 | Shibutani | F16C 13/006 74/569 |
| 2015/0101387 A1 | 4/2015 | Pallini | |
| 2018/0149257 A1 | 5/2018 | Prescavage et al. | |
| 2018/0355913 A1 | 12/2018 | Pallini et al. | |
| 2019/0219146 A1 * | 7/2019 | Malychok | F16H 53/06 |
| 2019/0264738 A1 * | 8/2019 | Malychok | F16C 33/7856 |

FOREIGN PATENT DOCUMENTS

| | | | |
|---|---|---|---|
| EP | 3211257 A1 | 8/2017 | |
| EP | 3680515 A1 | 7/2020 | |
| FR | 3071888 B1 * | 11/2019 | B21K 1/00 |
| JP | 06032809 U | 4/1994 | |
| JP | 2009299819 A * | 12/2009 | |
| JP | 2011202739 A * | 10/2011 | |

OTHER PUBLICATIONS

Machine Translation of JP-2011202739-A.*
Machine Translation of JP-2009299819-A.*
Machine Translation of FR-3071888-B1.*
Extended European Search Report issued in corresponding EP Application No. 19209491.0, dated Jun. 17, 2020, pp. 1-10.
"Rolling-element bearing." Wikipedia page, dated by Wayback Machine to Nov. 22, 2017, url: <https://web.archive.org/web/20171122095249/https://en.wikipedia.org/wiki/Rolling-element_bearing>.
Interference fit, Wikipedia Page, dated by Wayback Machine to Dec. 18, 2017, url: <https://web.archive.org/web/20171218194034/https://en.wikipedia.org/wiki/Interface_fit>.
Engineering fit, Wikipedia Page, dated by Wayback Machine to Apr. 19, 2017, url: <https://web.archive.org/web/20170419210428/https://en.wikipedia.org/wiki/Engineering_fit>.
Extended European Search Report issued in corresponding EP Application No. 21160528.2, dated Aug. 31, 2021, pp. 1-10.
EP Communication issued in corresponding EP Application No. 21167431.2, dated Dec. 12, 2022. pp. 1-7.

* cited by examiner

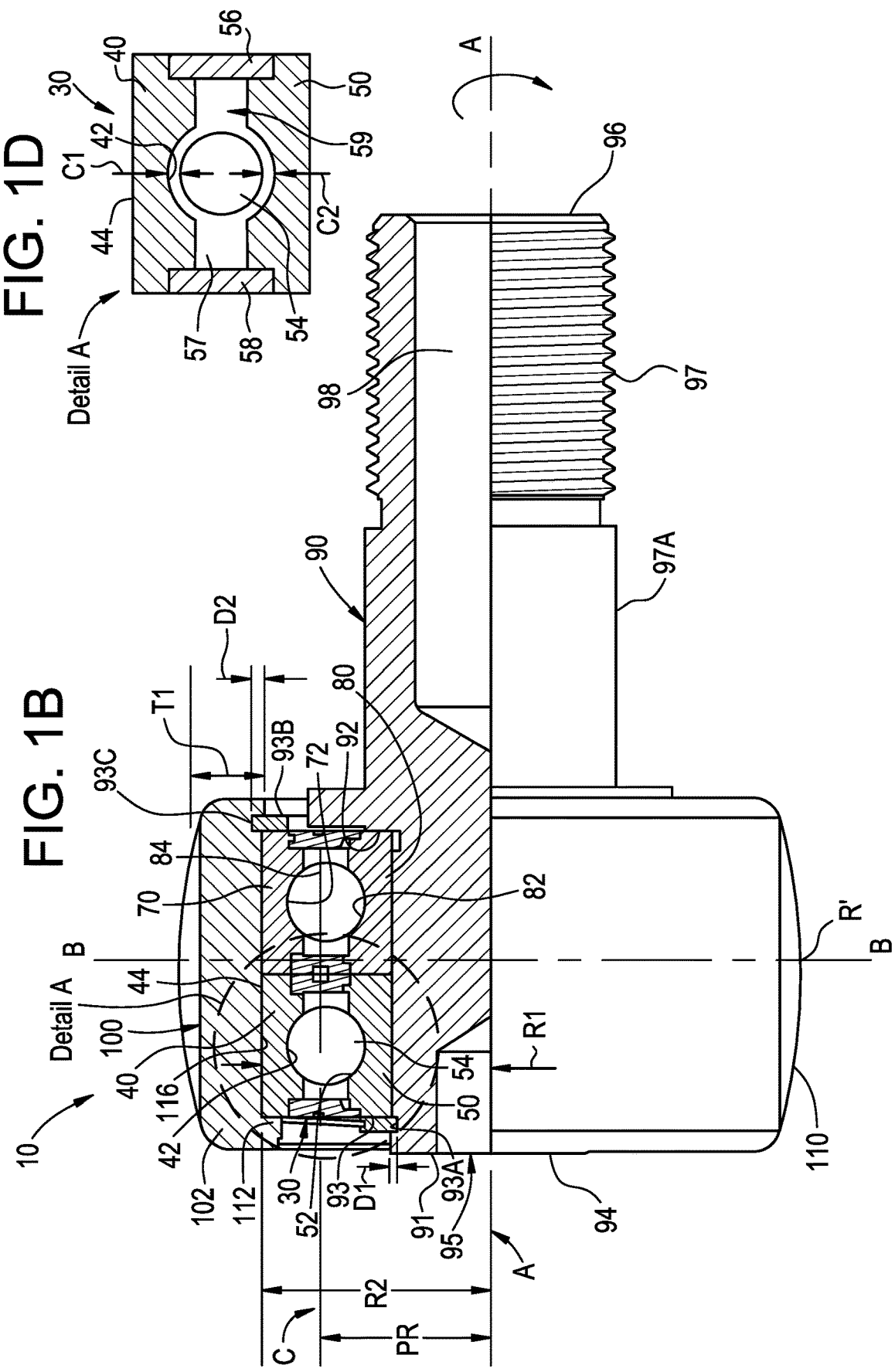

Load Profile For One Turret Cycle
— Roller 2

FIG. 7

Duty Cycle Life Results

| Roller Number | Ball Bearing Pair | Un-Factored Life (hr) | Factored Life Vacuum De-gased Steel (hr) | Fully Factored Life-Lube and Steel (hr) |
|---|---|---|---|---|
| 1 | 6003 | 1,510 | 3,322 | 8,640 |
| 1 | 6202 | 3,792 | 8,342 | 21,787 |
| 2 | 6003 | 4,095 | 9,009 | 23,600 |
| 2 | 6202 | 10,489 | 23,076 | 60,482 |

Inner Inboard Duty Cycle

Outer Inboard Duty Cycle

Outer Outboard Duty Cycle

Inner Outboard Duty Cycle

FIG. 12

| Roller | Roller Speed (rpm) | Individual Ball Bearing Life (hrs) | Roller Assembly Life (hrs) |
|---|---|---|---|
| Outer Inboard 10D' | 5110 | 52,610 | 28,193 |
| Outer Outboard 10C' | 5110 | 294,860 | 138,010 |
| Inner Inboard 10B' | 3725 | 464,150 | 248,730 |
| Inner Outboard 10A' | 3725 | 2,072,500 | 1,110,600 |

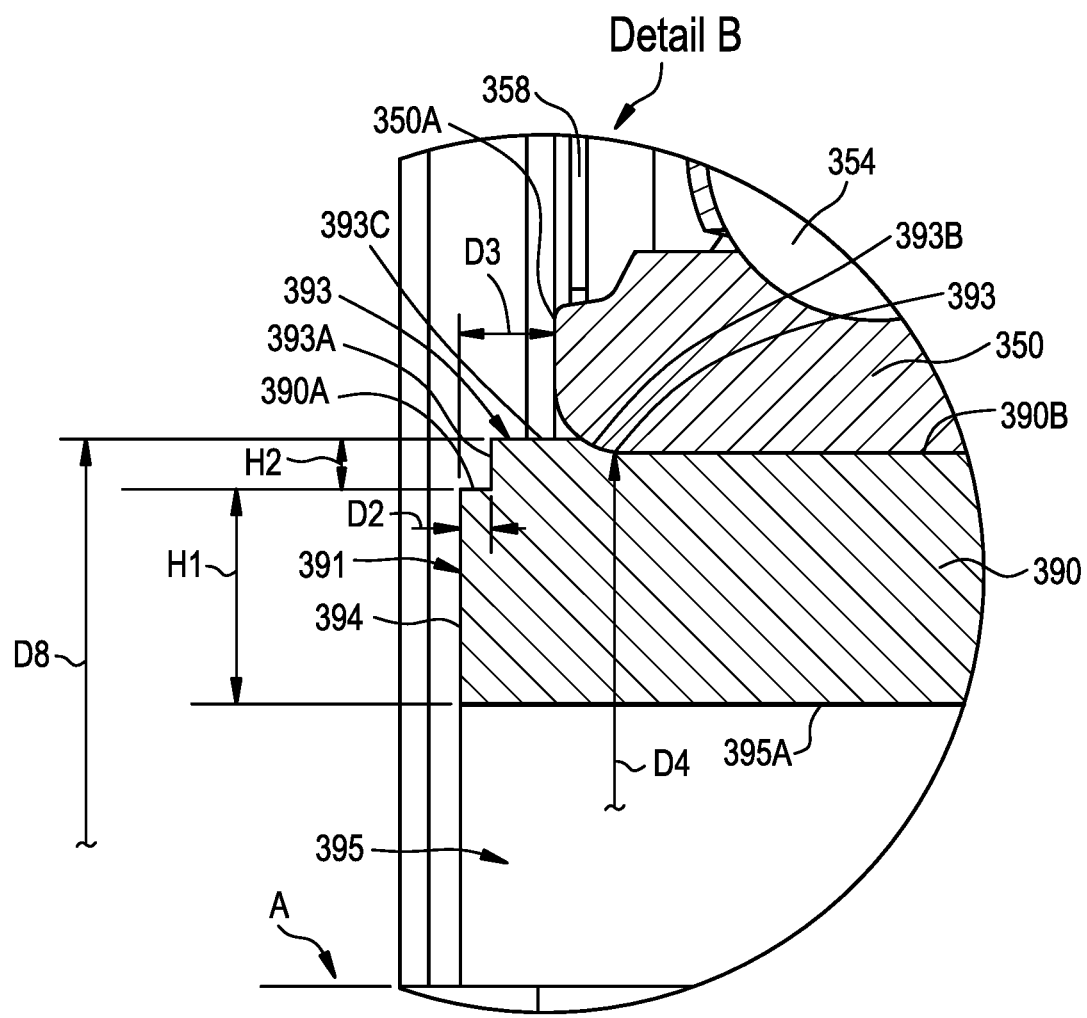

MAINTENANCE FREE EXTENDED LIFE CAM FOLLOWER FOR A NECKER MACHINE

CROSS REFERENCE TO RELATED APPLICATIONS

The present application is a continuation-in-part application of, and claims priority benefit to, U.S. patent application Ser. No. 16/684,827 filed Nov. 15, 2019, which claims priority benefit to U.S. Provisional Patent Application No. 62/824,548 filed on Mar. 27, 2019, U.S. Provisional Patent Application No. 62/823,165 filed on Mar. 25, 2019, and U.S. Provisional Patent Application No. 62/768,323 filed on Nov. 16, 2018, the contents of each of which are incorporated herein by reference in their entirety.

FIELD

The present invention is generally directed to a maintenance free cam follower for a metal can production necker. More specifically, the present invention is directed to an axial retainment system for a shaft of a cam follower having a swaged ridge proximate an outboard end of the shaft for retaining and compressing ball bearings on the shaft.

BACKGROUND

Metal cans are often produced as two-piece cans which comprise a cylindrical can body with an integral bottom wall and a can top. The can is typically made from aluminum. Typically, curved sections are formed at the bottom and top of the can to increase its structural integrity.

The beverage can fabrication industry utilizes a variety of aluminum bending and shaping machines that have very demanding requirements. A typical beverage can fabrication plant runs 24 hours per day and can produce upwards to 3000 cans per minute across 3 to 4 several fabrication lines. A can making machine, sometimes referred to as a necker, forms the curved sections of the can by progressively squeezing, i.e. necking, the can body between opposing ram bodies which squeeze the can. The ram typically includes one or more cam followers extending therefrom. The cam followers ride on a cam that is mounted on a cylinder. As the ram rotates about the cylinder, the cam follower rides on the cam, which is configured to move the ram back and forth.

One of the operations in the line is called the necking station. These machines consist of rotating high-speed turrets that feed the can in and gradually form a neck and a flange at the top of the can that will eventually mate with the lid after filling. Stud mounted cam followers are a vital part of the mechanism in the necking station allowing the cans to enter, get worked, and exit.

Automated greasing systems are required to keep the cam followers lubricated and able to provide sufficient service life. Machine design complexity and maintenance is greatly reduced if these cam followers are designed to be maintenance free.

Therefore, there is a need for improved maintenance free cam followers that are creep free and that also include optimized ball bearing internal clearance reduction for maximum service life.

SUMMARY

The present invention resides in one aspect in an axial retainment system for a shaft. The axial retainment system includes a cylindrical body extending from an outboard end to an inboard end thereof, and a swaged ridge extending radially outward from the cylindrical body proximate the outboard end. The swaged ridge has an outboard axial surface facing toward the outboard end and extending radially outward and terminating at a radially outward facing circumferential surface. The swaged ridge has an inboard axial surface facing toward the inboard end and extending radially outward from the cylindrical body and terminating at the radially outward facing circumferential surface.

In one embodiment, the outboard axial surface is recessed axially inward from the outboard end.

In one embodiment, the outboard axial surface is substantially flat.

In one embodiment, the outboard end of the shaft includes a torque transmission aperture extending axially inward therefrom. The torque transmission aperture has a radially inward facing engagement surface. The outboard axial surface is spaced apart from the engagement surface by a neutral zone that extends a predetermined radial distance from the engagement surface to the radially innermost portion of the outboard axial surface, to prevent deformation of the engagement surface when forming the swaged ridge.

In one embodiment, the inboard axial surface is swaged against, conforms in shape to, and is compressed against a component to be axially retained on the shaft.

In one embodiment, the inboard axial surface is substantially flat.

In one embodiment, the inboard axial surface is arcuate.

In one embodiment, the inboard axial surface is beveled.

In one embodiment, the cylindrical body has an outboard diameter as measured proximate the outboard end, and the swaged ridge has a swage diameter as measured at the radially outward facing circumferential surface. The swage diameter is greater than the outboard diameter.

In one embodiment, the swage diameter is about 4% to about 6% greater than the outboard diameter.

In one embodiment, the system further includes a circumferential flange extending radially outward from the cylindrical body between the swaged ridge and the inboard end. The flange has a shoulder extending axially outward toward the outboard end on an outboard axial surface of the flange.

In one embodiment, the system further includes a component being axially retained and compressed between the shoulder of the flange and the inboard axial surface of the swaged ridge.

In one embodiment, the component includes at least one ball bearing. The at least one ball bearing has a plurality of rolling elements disposed between an inner ring and an outer ring. The inner ring axially abuts the inboard axial surface of the swaged ridge and the shoulder of the flange.

There is also disclosed herein a cam follower that includes an outer ring that has an outer ring bearing surface and an exterior surface, and an inner ring that is coaxially disposed in the outer ring. The inner ring has an inner ring bearing surface and a bore extending therethrough. A plurality of rolling elements is disposed in an annular cavity between the outer ring bearing surface and the inner ring bearing surface. The plurality of rolling elements is in rolling engagement with the outer ring bearing surface and the inner ring bearing surface such that the outer ring is rotatable relative to the inner ring about a shaft axis. A shaft is received in the bore in the inner ring so that the shaft is fixed relative to the inner ring about the longitudinal axis of the shaft. The shaft has a first end and a second end. The shaft has a circumferential flange extending radially outward from the shaft and located between the first end and the second end. The shaft has a swaged ridge formed at the first end extending radially outward and extending circumferentially around the shaft. The inner ring is axially retained on the shaft by the swaged ridge and the flange.

In one embodiment, the outer ring is received in a tire. The tire has a thickness and a crown radius. The crown radius has an apex. The inner ring and the outer ring are axially centered with respect to the apex. The composition of the tire includes at least one of a metallic material, a plastic material, and a non-metallic material. The tire has a groove formed therein. The groove extends radially outward and extends circumferentially therearound. The outer ring is axially retained by a clip disposed at a depth in the groove.

In one embodiment, the swaged ridge impacts an axial compressive force on the inner ring to retain and compress the inner ring between the swaged ridge and the flange.

In one embodiment, the ratio of the depth to the tire thickness is between 0.17 and 0.19.

In one embodiment, a first distance is defined between an exterior surface of the outer ring and the longitudinal axis of the shaft, and a second distance is defined between the longitudinal axis of the shaft and an interior surface of the tire. A ratio of the first distance to the second distance is between 1.000 and 1.015.

In one embodiment, the plurality of rolling elements is a plurality of spherical balls.

In one embodiment, the cam follower has a duty cycle and a bearing load capacity is selected based on the duty cycle.

In one embodiment, the swaged ridge is formed by swaging the first axial end of the shaft with a swage die. The swage die includes a body having a first end configured to be mounted to a pressing device and a second end opposite the first end. The second end has a cylindrical extension extending from the second end away from the first end. The cylindrical extension has an end surface with a cylindrical punch cavity therein configured to engage and swage the first axial end of the shaft.

In one embodiment, the swaged ridge has a first axial surface facing toward the first end of the shaft and extending radially outward from the shaft and terminating at a radially outward facing circumferential surface. The swaged ridge has a second axial surface facing toward the second end of the shaft and extending radially outward from the shaft and terminating at the radially outward facing circumferential surface.

In one embodiment, the first axial surface of the swaged ridge is recessed axially inward from the first end of the shaft.

In one embodiment, the first axial surface of the swaged ridge is substantially flat.

In one embodiment, the first end of the shaft includes a torque transmission aperture extending axially inward therefrom. The torque transmission aperture has a radially inward facing engagement surface. The first axial surface of the swaged ridge is spaced apart from the engagement surface by a neutral zone that extends a predetermined radial distance from the engagement surface to the radially innermost portion of the first axial surface, to prevent deformation of the engagement surface when forming the swaged ridge.

In one embodiment, the second axial surface of the shaft is swaged against, conforms in shape to, and is compressed against the inner ring.

In one embodiment, the second axial surface is substantially flat.

In one embodiment, the second axial surface is arcuate.

In one embodiment, the second axial surface is beveled.

In one embodiment, the circumferential flange has a shoulder extending axially outward toward the first end of the shaft on a first axial surface of the flange. The inner ring is axially retained and compressed between the shoulder of the flange and the second axial surface of the swaged ridge.

There is also disclosed herein a cam follower that includes a shaft extending from a first axial end to a second axial end, a tire defining an interior area, a first ball bearing, and a second ball bearing. The shaft has a swaged ridge proximate to the first axial end, and a shoulder formed on the shaft between the swaged ridge and the second axial end. The tire has a flange extending radially inward from one axial end of the tire proximate the first axial end of the shaft, and an axial retainment feature at a second axial end of the tire. The first ball bearing has a first plurality of rolling elements disposed between a first inner ring and a first outer ring. The second ball bearing has a second plurality of rolling elements disposed between a second inner ring and a second outer ring. The first outer ring and the second outer ring extending at least partially into the interior area of the tire. The first inner ring axially abuts the second inner ring and the swaged ridge. The second inner ring axially abuts the shoulder and the first inner ring. The first outer ring axially abuts the second outer ring and the flange. The second outer ring axially abuts the first outer ring and the axial retainment system. The swaged ridge axially retains the first inner ring and the second inner ring on the shaft between the swaged ridge and the shoulder.

In one embodiment, the swaged ridge imparts an axial compressive force on the first inner ring and the second inner ring to retain and compress the first inner ring and the second inner ring between the swaged ridge and the shoulder.

In one embodiment, the cam follower further includes a first seal extending radially between the first inner ring and the first outer ring, a second seal extending between the first inner ring and the first outer ring, a third seal extending between the second inner ring and the second outer ring, and a fourth seal extending between the second inner ring and the second outer ring proximate to the axial retainment system. The second seal and the first seal sealing a first lubricant therebetween and the third seal and the fourth seal sealing a second lubricant therebetween.

In one embodiment, the flange extends radially inward from the first axial end of the tire a first radial distance, and the axial retainment feature includes an angled abutment shoulder extending radially inward from the second axial end of the tire a second radial distance. The second radial distance is less than the first radial distance.

In one embodiment, the angled abutment shoulder includes an outboard sloped abutment surface extending radially and axially inward from an interior surface of the tire to a radially inward facing surface of the angled abutment shoulder, and an inboard sloped relief surface extending radially inward and axially outward from the second axial end of the tire to the radially inward facing surface of the angled abutment shoulder.

In one embodiment, the axial retainment system includes a groove extending radially outward at the second axial end of the tire.

In one embodiment, a clip is disposed at a depth in the groove. The tire has a thickness and a crown radius. The crown radius has an apex. The first inner ring and the second inner ring are axially centered with respect to the apex. The composition of the tire includes at least one of a metallic material, a plastic material, a non-metallic material, and combinations thereof.

In one embodiment, a ratio of the depth of the groove to the tire thickness is between 0.17 and 0.19.

In one embodiment, a ratio of the tire thickness to a pitch radius of at least one of the bearings is between 0.18 and 0.19.

In one embodiment, a first distance is defined between an exterior surface of the first outer ring and the shaft axis, and a second distance is defined between the shaft axis and an interior surface of the tire. The ratio of the first distance to the second distance is between 1.000 and 1.015.

In one embodiment, the shaft includes a hollow portion.

In one embodiment, the swaged ridge has a first axial surface facing toward the first end of the shaft and extending radially outward from the shaft and terminating at a radially outward facing circumferential surface. The swaged ridge has a second axial surface facing toward the second end of the shaft and extending radially outward from the shaft and terminating at the radially outward facing circumferential surface.

In one embodiment, the first axial surface of the swaged ridge is recessed axially inward from the first end of the shaft.

In one embodiment, the first axial surface of the swaged ridge is substantially flat.

In one embodiment, the first end of the shaft includes a torque transmission aperture extending axially inward therefrom. The torque transmission aperture has a radially inward facing engagement surface. The first axial surface of the swaged ridge is spaced apart from the engagement surface by a neutral zone that extends a predetermined radial distance from the engagement surface to the radially innermost portion of the first axial surface, to prevent deformation of the engagement surface when forming the swaged ridge.

In one embodiment, the second axial surface of the shaft is swaged against, conforms in shape to, and is compressed against the inner ring.

In one embodiment, the second axial surface is substantially flat.

In one embodiment, the second axial surface is arcuate.

In one embodiment, the second axial surface is beveled.

In one embodiment, the cam follower includes a first cam follower segment and a second cam follower segment.

In one embodiment, the first cam follower segment has a first duty cycle and a first bearing load capacity being selected based on the first duty cycle.

In one embodiment, the second cam follower segment has a second duty cycle and a second bearing load capacity being selected based on the second duty cycle.

There is further disclosed herein a method of assembling a cam follower. The method includes the steps of: providing a shaft extending from a first axial end to a second axial end thereof, the shaft having a circumferential shoulder extending radially outward from the shaft and being located between the first axial end and the second axial end; providing at least one bearing, the at least one bearing having an inner ring defining a bore, an outer ring coaxially disposed on the inner ring, and a plurality of rolling elements disposed between the inner ring and the outer ring; providing a swage die comprising a body having a first end configured to be mounted to a pressing device and a second end opposite the first end, the second end having a cylindrical extension extending from the second end away from the first end, the cylindrical extension having an end surface with a cylindrical punch cavity therein; inserting the first axial end of the shaft through the bore of the at least one bearing; positioning the at least one bearing on the shaft such that a first axial end of the inner ring abuts the circumferential shoulder of the shaft; securing the shaft in a fixture with the first axial end extending outwardly from the fixture; placing the punch cavity of the swage die on the first axial end of the shaft; pressing the swage die against the first axial end of the shaft; and swaging a swaged ridge on the shaft with the swage die, the swaged ridge extending radially outward from the shaft at the first axial end of the shaft, the swaged ridge having a first axial surface facing toward the first axial end of the shaft and extending radially outward and terminating at a radially outward facing circumferential surface, the swaged ridge having a second axial surface facing toward the shoulder of the shaft and extending radially outward and terminating at the radially outward facing circumferential surface, the second axial surface of the swaged ridge conforms in shape to and compresses against a second axial end of the inner ring. The swaged ridge axially retains the inner ring on the shaft between the swaged ridge and the shoulder.

In one embodiment, the method further includes the steps of: providing a tire, the tire having a flange extending radially inward from a first axial end of the tire and a groove extending radially outward at a second axial end of the tire; providing a clip; securing the tire to the outer ring of the at least one bearing such that a first axial end of the outer ring abuts the flange; and inserting the clip into the groove of the tire such that a second axial end of the outer ring abuts the clip.

In one embodiment, the method further includes the steps of: providing a tire, the tire having a flange extending radially inward from a first axial end of the tire and an angled abutment shoulder extending radially inward from a second axial end of the tire; and securing the tire to the outer ring of the at least one bearing such that a first axial end of the outer ring abuts the flange and a second axial end of the outer ring abuts the angled abutment shoulder. The angled abutment shoulder includes an outboard sloped abutment surface extending radially and axially inward from an interior surface of the tire to a radially inward facing surface of the angled abutment shoulder, and an inboard sloped relief surface extending radially inward and axially outward from the second axial end of the tire to the radially inward facing surface of the angled abutment shoulder.

In one embodiment, the method further includes performing a visual inspection of the swaged ridge to determine that the swaged ridge has a swage diameter as measured at the radially outward facing circumferential surface. The swage diameter is about 4% to about 6% greater than an outboard diameter of the shaft as measured at the at least one bearing.

There is also disclosed herein a method of visually inspecting a cam follower. The method includes the steps of: providing a shaft extending from a first axial end to a second axial end thereof, the shaft having a swaged ridge extending radially and circumferentially outward from the shaft and being located proximate the first axial end, the shaft having a bearing positioned thereon such that a first axial end of the bearing abuts the swaged ridge, the swaged ridge having a first color and the bearing having a second contrasting color; providing a visual inspection system configured to scan a face of an object, differentiate between at least two contrasting colors of at least two adjacent surfaces of the object, and measure a distance along the face of the object; scanning the first axial end of the shaft using the visual inspection system; differentiating between the first color of the swaged ridge and the second contrasting color of the bearing; measuring a swage diameter $D8$ of the swaged ridge at a radially outward facing circumferential surface thereof.

In one embodiment, the method further includes confirming that the swage diameter D8 is about 4% to about 6% greater than an outboard diameter D4 of the shaft as measured at the bearing.

In one embodiment, the first color of the swaged ridge is darker relative to the second contrasting color of the bearing.

There is also disclosed herein a cam follower that includes an outer ring that has an outer ring bearing surface and an exterior surface; and an inner ring that is coaxially disposed in the outer ring. The inner ring has an inner ring bearing surface and a bore extending therethrough. A group of rolling elements is disposed in an annular cavity formed between the outer ring bearing surface and the inner ring bearing surface. The group of rolling elements is in rolling engagement with the outer ring bearing surface and the inner ring bearing surface such that the outer ring is rotatable relative to the inner ring about a shaft axis. The group of rolling elements have a pitch radius defined by a distance between a longitudinal axis of the shaft and a rolling element axis. A shaft is received in the bore in the inner ring so that the shaft is fixed relative to the inner ring about the longitudinal axis of the shaft. The shaft has a first groove formed therein. The first groove extends radially inward and circumferentially around the shaft. The group of rolling elements are disposed between a first seal and a second seal which seal a lubricant therebetween. The inner ring is axially retained by a first clip that is disposed at a depth in the first groove. The outer ring is received in a tire which has a thickness and a crown radius. The crown radius has an apex. The inner ring and the outer ring are axially centered with respect to the apex. The composition of the tire includes a metallic material, a plastic material, and/or a non-metallic material. The tire has a second groove formed therein, extending radially outward and extending circumferentially therearound. The outer ring is axially retained by a second clip that is disposed at the depth in the second groove.

In one embodiment, a ratio of the depth to the tire thickness is between 0.17 and 0.19.

In one embodiment, a ratio of the tire thickness to the pitch radius is between 0.18 and 0.19.

In one embodiment, a first distance is defined between an exterior surface of the outer ring and the longitudinal axis of the shaft and a second distance is defined between the longitudinal axis of the shaft and an interior surface of the tire, wherein a ratio of the first distance to the second distance is between 1.000 and 1.015.

In one embodiment, the group of rolling elements is a group of spherical balls.

In one embodiment, the cam follower has a duty cycle and a bearing load capacity being selected based on the duty cycle.

In one embodiment, the shaft includes a hollow portion.

There is also disclosed herein a cam follower that includes a shaft that extends from a first axial end to a second axial end. The shaft has a first groove proximate to the first axial end and a shoulder formed in the shaft between the first groove and the second axial end. A first clip is radially engaged in the first groove. The cam follower includes a tire that has an interior area and a flange that extends extending radially inward from the tire at an axial end of the tire. A second groove extends radially outward at another axial end of the tire. The cam follower includes a first ball bearing and a second ball bearing. The first ball bearing has a first group of rolling elements disposed between a first inner ring and a first outer ring. The second ball bearing has a second group of rolling elements disposed between a second inner ring and a second outer ring. The first outer ring and the second outer ring extend partially into the interior area of the tire. The first inner ring axially abuts the second inner ring and the first clip. The second inner ring axially abuts the shoulder and the first inner ring. The first outer ring axially abuts the second outer ring and the flange. The second outer ring axially abuts the first outer ring and a second clip which is engaged in the second groove. The first clip axially retains the first inner ring and the second inner ring on the shaft between the first clip and the shoulder.

In one embodiment, a first seal extends between the first inner ring and the first outer ring; a second seal extends between the first inner ring and the first outer ring; a third seal extends between the second inner ring and the second outer ring; and a fourth seal extends between the second inner ring and the second outer ring, proximate to the first clip. The second seal and the first seal sealing a first lubricant therebetween and the third seal and the fourth seal sealing a second lubricant therebetween.

In one embodiment, the first clip is disposed at the depth in a first groove and a second clip is disposed at the depth in a second groove and the first tire has a thickness and a crown radius that has an apex. The first inner ring and the second inner ring are axially centered with respect to the apex. The composition of the tire includes a metallic material, a plastic material, a non-metallic material, and combinations thereof.

In one embodiment, a ratio of the depth to the tire thickness is between 0.17 and 0.19.

In one embodiment, a ratio of the tire thickness to a pitch radius of the bearing is between 0.18 and 0.19.

In one embodiment, a first distance is defined between an exterior surface of the first outer ring 40 and the longitudinal axis of the shaft and a second distance is defined between the longitudinal axis of the shaft and an interior surface of the tire and a ratio of the first distance to the second distance is between 1.000 and 1.015.

In one embodiment, the shaft includes a hollow portion.

In one embodiment, the cam follower includes a first cam follower segment and a second cam follower segment.

In one embodiment, the first cam follower segment has a first duty cycle and a bearing load capacity being selected based on the first duty cycle.

In one embodiment, the second cam follower segment has a second duty cycle and a bearing load capacity being selected based on the second duty cycle.

There is further disclosed herein a cam follower that includes a shaft that extends from a first axial shaft end to a second axial shaft end. The shaft has a first groove located proximate to the first axial shaft end. The shaft has a shoulder formed in (extending radially outward from) the shaft and located between the first groove and the second axial shaft end. A first clip is radially engaged in the first groove. The cam follower includes two cam follower segments, namely a first cam follower segment and a second cam follower segment. The first cam follower segment includes a first tire that defines a first interior area. The first cam follower segment has a first ball bearing and a second ball bearing, both being partially disposed in the first interior area of the first tire. The second cam follower segment includes a second tire that defines a second interior area. The second cam follower segment has a third ball bearing and a fourth ball bearing, both being partially disposed in the second interior area. The cam follower includes a spacer disposed on the shaft between the second ball bearing and the third ball bearing. The first cam follower segment and the second cam follower segment are axially retained on the shaft by the first clip, the spacer and the shoulder.

In one embodiment, the first tire includes: (i) a first flange extending radially inward from the first tire and located at a first axial tire end of the first tire; (ii) a second groove extending radially outward into the first tire and located at a second axial tire end of the first tire; and (iii) a second clip is engaged in the second groove. The second tire includes: (i) a second flange extending radially inward from the second tire and located at an third axial tire end of the second tire; (ii) a third groove extending radially outward into the second tire and located at a fourth axial tire end of the second tire; and (iii) a third clip engaged in the third groove.

In one embodiment, the first ball bearing has a first inner ring disposed in a first outer ring and has a first group of rolling elements disposed between the first inner ring and the first outer ring. The second ball bearing has a second inner ring disposed in a second outer ring and has a second group of rolling elements disposed between the second inner ring and the second outer ring. The first inner ring axially abuts the second inner ring and the first clip. The first outer ring axially abuts the second outer ring and the first flange. The second outer ring axially abuts the second clip. The third ball bearing has a third inner ring disposed in a third outer ring and has a third group of rolling elements disposed between the third inner ring and the third outer ring. The fourth ball bearing has a fourth inner ring disposed in a fourth outer ring and has a fourth group of rolling elements disposed between the fourth inner ring and the fourth outer ring. The third inner ring axially abuts the fourth inner ring. The fourth inner ring axially abuts the shoulder. The third outer ring axially abuts the second flange and the fourth outer ring. The fourth outer ring axially abuts the third outer ring. The spacer abuts the second inner ring and the third inner ring.

In one embodiment, the first group of rolling elements is disposed between a first seal and a second seal. The first seal and the second seal contain (i.e., seal) a first lubricant therebetween. The second group of rolling elements is disposed between a third seal and a fourth seal. The third seal and the fourth seal contain (i.e., seal) sealing a second lubricant therebetween. The third group of rolling elements is disposed between a fifth seal and a sixth seal. The fifth seal and the sixth seal contain (i.e., seal) a third lubricant therebetween. The fourth group of rolling elements is disposed between a seventh seal and an eighth seal. The seventh seal and the eighth seal contain (i.e., seal) a fourth lubricant therebetween.

In one embodiment, the first seal is fixed to the first outer ring, the third seal is fixed to the second outer ring, the fifth seal is fixed to the third outer ring, and the seventh seal is fixed to the fourth outer ring.

In one embodiment, the second seal is fixed to the first outer ring, the fourth seal is fixed to the second outer ring, the sixth seal is fixed to the third outer ring, and eighth seal is fixed to the fourth inner ring.

In one embodiment, the first inner ring, the second inner ring, the spacer, the third inner ring, and the fourth inner ring define an axial stackup.

BRIEF DESCRIPTION OF THE DRAWINGS

FIG. 1B is another partial quarter section view of some of the elements of the cam follower shown in FIG. 1A.

FIG. 1D is a cross-sectional view of the first bearing depicted in Detail A of FIG. 1B, with the internal clearance C1, C2 exaggerated for clarity purposes. FIG. 1D is also representative of the bearings depicted in FIG. 8.

FIG. 7 depicts duty cycle life results for a first and a second cam follower.

FIG. 12 depicts duty life cycle results for the aforementioned inner and outer inboard cam followers and the inner and outer outboard cam followers.

FIG. 13B is a cross-sectional view of the swaged ridge depicted in Detail B of FIG. 13A.

DETAILED DESCRIPTION

Figure 1A:
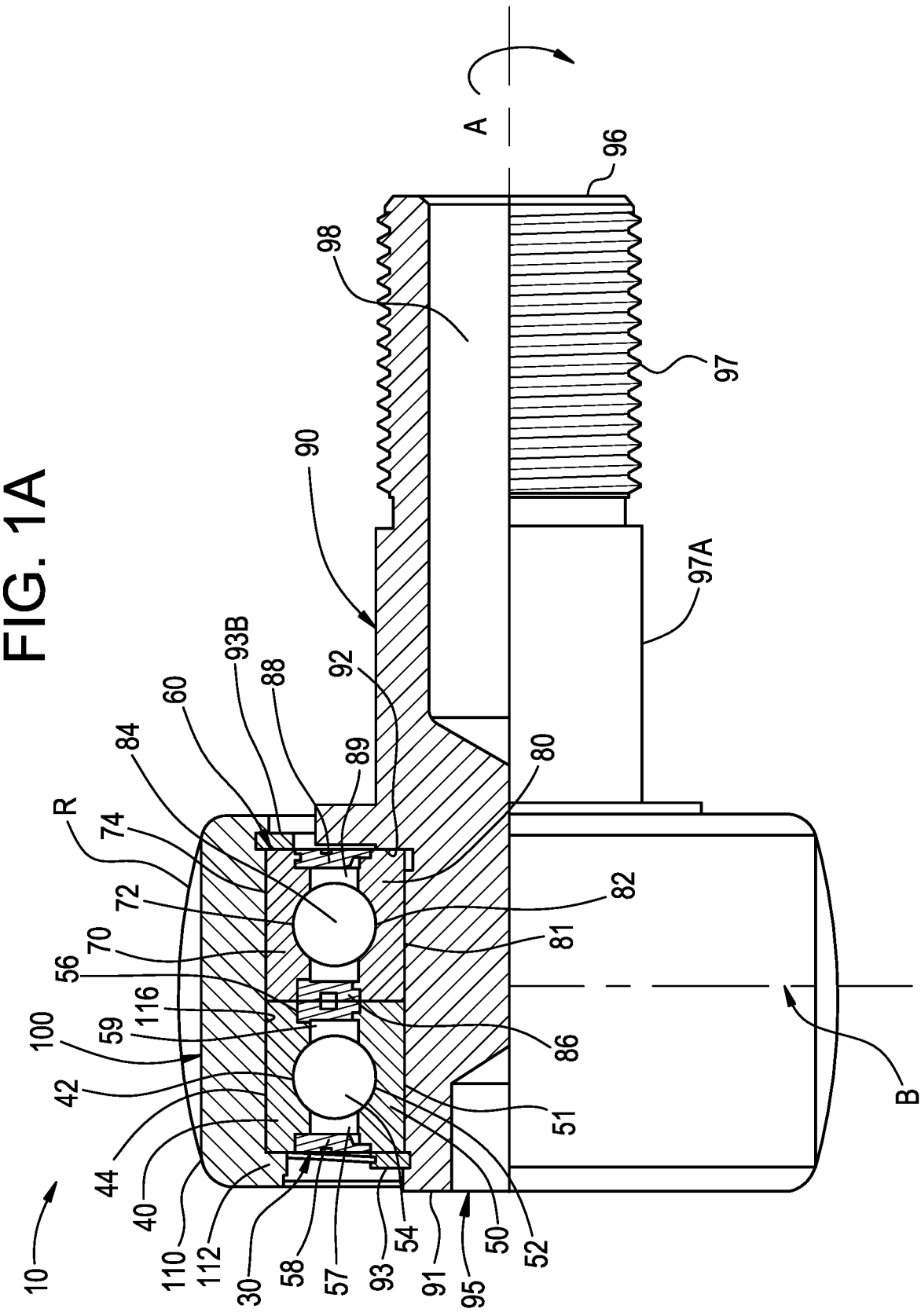
FIG. 1A is partial cross-sectional view of a cam follower in accordance with one embodiment of the present invention.

As shown in FIGS. 1A-D and 2, a cam follower 10 for a ram of a necker machine is shown and is generally designated by the reference numeral 10. The cam follower 10 includes a first ball bearing 30 and a second ball bearing 60. The first ball bearing 30 and the second ball bearing 60 are configured in a tandem configuration. That is, they are positioned axially side to side, coaxially with a first axis of rotation A. In the embodiment shown, an inner ring 50 of the first ball bearing 30 and an inner ring 80 of the second ball bearing 60 are axially and radially fixed relative to each other about the first axis of rotation A.

The first ball bearing 30 includes a first outer ring 40 that has a first outer race 42 (also referred to as a bearing surface) and a first exterior surface 44. The first ball bearing 30 further includes the first inner ring 50 which has a first inner race 52 (also referred to as a bearing surface). The first inner ring 50 is coaxially disposed in the first outer ring 40. A first plurality of rolling elements 54 are disposed between the first outer race 42 and the first inner race 52. The first plurality of rolling elements 54 are, for example, spherical balls. The first plurality of rolling elements balls 54 are in rolling engagement with the first outer race 42 and the first inner race 52 such that the first outer ring 40 is rotatable relative to the first inner ring 50 about the first axis of rotation A.

The first ball bearing 30 includes a second seal 56 extending radially between the first outer ring 40 and the first inner ring 50 on one side of the first plurality of rolling elements 54. The first ball bearing 30 further includes a first seal 58 that extends radially between the first outer ring 40 and the first inner ring 50 such that the first plurality of rolling elements 54 is sealingly positioned between the first seal 58 and the second seal 56. The first seal 58 and the second seal 56 are configured to retain a lubricant 57 inside an annular cavity 59 formed between the first outer race 42 and the first inner race 52 in which the first plurality of rolling elements 54 is disposed. The seals 56, 58 are made of a molded nitrile rubber, however, as can be appreciated by a person having ordinary skill in the art and familiar with this disclosure, the seals 56, 58, also referred to as shields, can employ different materials in alternate embodiments.

The lubricant 57 is selected to be maintenance free and to function for the useful life of the cam follower 10. In some embodiments, the lubricant 57 is a general-purpose wide temperature range grease having anti-oxidation and anti-wear properties.

In the embodiment disclosed in FIG. 1A, the second ball bearing 60 is similar in configuration to the first ball bearing 30. The second ball bearing 60 includes a second outer ring 70 that has a second outer race 72 (also referred to as a bearing surface) and a second exterior surface 74. The second ball bearing 60 further includes a second inner ring 80 that has a second inner race 82 (also referred to as a bearing surface). The second inner ring 80 is coaxially disposed in the second outer ring 70. A second plurality of rolling elements 84 are disposed between the second outer race 72 and the second inner race 82. The second plurality of rolling elements 84 are, for example, spherical balls. The second plurality of rolling elements 84 are in rolling engagement with the second outer race 72 and the second inner race 82 such that the second outer ring 70 is rotatable relative to the second inner ring 80 about the first axis of rotation A.

The second ball bearing 60 includes a third seal 86 that extends radially between the second outer ring 70 and the second inner ring 80 on one side of the second plurality of rolling elements 84. The second bearing 60 further includes a fourth seal 88 that extends radially between the second outer ring 70 and the second inner ring 80 such that the second plurality of rolling elements 84 are sealingly positioned between the third seal 86 and the fourth seal 88. The seals 86, 88 are configured to retain the lubricant 57 inside an annular cavity 89 formed between the second outer race 72 and the second inner race 82. The second plurality of rolling elements 84 are disposed in the annular cavity 89. The seals 86, 88 are made of a molded nitrile rubber, however, as can be appreciated by a person having ordinary skill in the art and being familiar with this disclosure, the seals 86, 88, also referred to as shields, can employ different materials in alternate embodiments.

In reference to the embodiment shown in FIGS. 1A, 1B, 1C, 1D, and 2, although the cam follower 10 is shown having a first ball bearing 30 and a second ball bearing 60, the present invention is not limited in this regard and, as will be appreciated by a person of ordinary skill in the art, many different configurations may be employed. For example, the present invention is practiced using a cam follower having a single row of roller or ball bearings. Or, for example, in one embodiment the present invention is practiced using a cam follower having a ball bearing wherein a single continuous outer ring defines a first outer race and a second outer race, and a single continuous inner ring defines a first inner raceway and a second inner raceway.

Figure 1C:
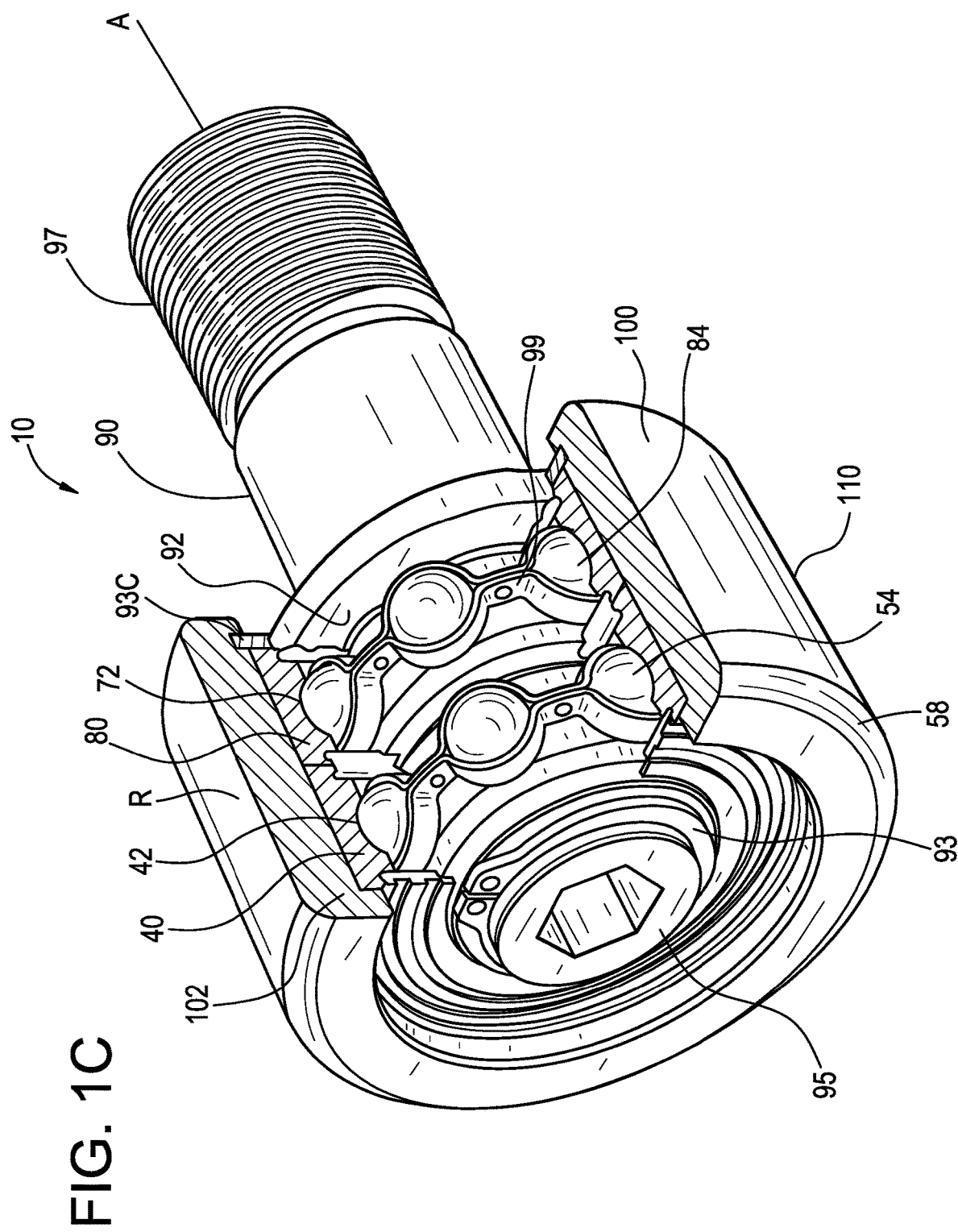
FIG. 1C is an isometric quarter section view of some of the elements of the cam follower shown in FIG. 1A.
Figure 2:
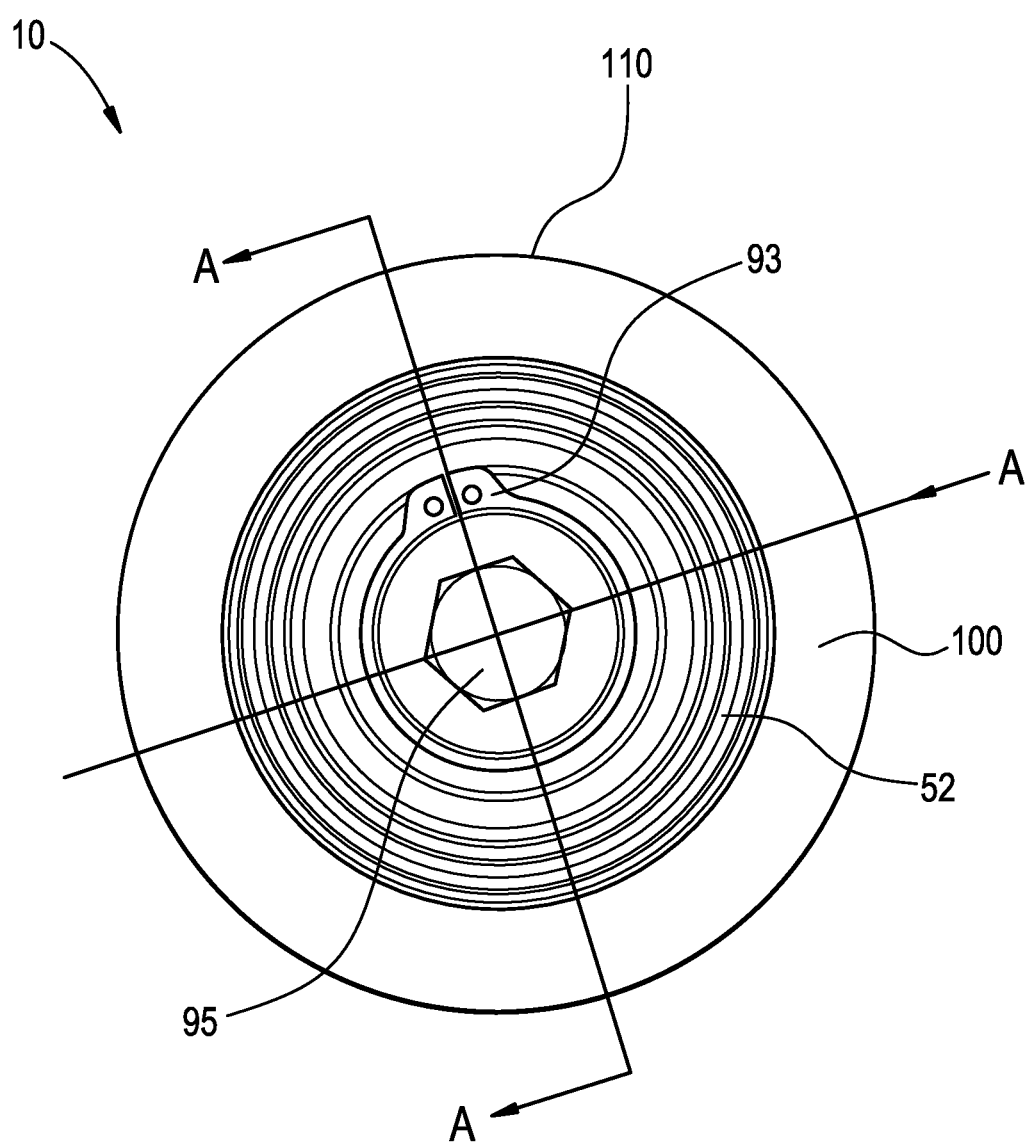
FIG. 2 is a side view of the cam follower shown in FIG. 1A.

In the embodiment shown in in FIGS. 1A, 1B, 1C, 1D, and 2, the outer ring 40, the outer ring 70, the inner ring 50 and/or the inner ring, 80 are manufactured from a 52100 steel that is through hardened. The first plurality of rolling elements 54 and the second plurality of rolling elements 84 also are manufactured from a 52100 steel. As shown in FIG. 1C, each of the first plurality of rolling elements 54 are separated by a cage 99; and each of the second plurality of rolling elements 84 are separated by another cage 99. The cages 99 are manufactured from a low carbon soft steel. It should be understood that the present invention is not limited to using the cage 99 to separate adjacent rolling elements 54 from one another and another cage 99 to separate adjacent rolling elements 84, as different spacers, or no spacers, may be employed between the balls in the first plurality of rolling elements 54 and as different spacers, or no spacers, may be employed between the balls in the second plurality of rolling elements 84. It should also be understood that the present invention is not limited to balls, as other types of rolling elements may be employed with the present invention, for example, needle rollers.

Although specific materials are disclosed herein, a person of ordinary skill in the art and familiar with this disclosure will understand that the present invention is not limited in this regard, and that other materials may be used with the present invention.

In reference to in FIGS. 1A, 1B, 1C, 1D, and 2, the first inner ring 50 has a first bore 51 extending therethrough, and the second inner ring 80 has a second bore 81 extending therethrough. A shaft 90 is received through the first bore 51 and the second bore 81. In the embodiment shown in FIGS. 1A-2, the shaft 90 is press fit in the first bore 51 and the second bore 81 such that the first inner ring 50 and the second inner ring 80 are fixed relative to the shaft about the first axis of rotation A. The shaft 90, also referred to as a stud, extends between a first axial end 91 and a second axial end 96. The shaft 90 has a first groove 93A formed therein. The first groove 93A extends radially inward into the shaft 90 and circumferentially around the shaft 90 (e.g., continuously around). The first groove 93A is located proximate the first axial end 91 of the shaft 90.

The first ball bearing 30 and the second ball bearing 60 axially abut one another and are received on the shaft 90 proximate to the first axial end 91, thereof. The shaft 90 has a shoulder 92 projecting radially outward from the shaft 90. The shoulder 92 is located between the first axial end 91 and the second axial end 96. Once assembled, the second inner ring 80 abuts the shoulder 92 to inhibit axial movement of the ball bearings 30, 60 relative to the shaft 90. A first clip 93 is fixedly received in the groove 93A on the shaft 90, such that the first inner ring 50 of first ball bearing 30 and the second inner ring 80 of the second ball bearing 60 are disposed and retained axially between the first clip 93 and the shoulder 92. A tire 100 extends circumferentially around the first outer ring 40 and the second outer ring 70. A second groove 93C is formed in tire 100. The second groove 93C extends circumferentially around and radially outward into the tire 100. The second groove 93C is located proximate an inner axial end of the second outer ring 70. The tire 100 has a radially inward projecting flange 112 located proximate an outer axial end of the first outer ring 40 proximate to the first axial end 91 of the shaft 90. A second clip 93B is seated in the second groove 93C to axially retain first outer ring 40 and the second outer ring 70 between the second clip and the flange 112 and to inhibit axial movement of the ball bearings 30, 60 relative to the shaft 90. The first clip 93 engages the inner ring 50 of the first ball bearing 30 to axially secure the first ball bearing 30 on the shaft 90 and second clip 93B engages the outer ring 70 of the second ball bearing 60 to axially secure the second ball bearing 60 to the tire 100. The second inner ring 80 abuts the shoulder 92 of the shaft 90 such that the first inner ring 50 and the second inner ring 80 are fixed relative to one another and fixed relative to the A axis along the shaft 90. The first ball bearing 30 and the second ball bearing 60 are located symmetrically on opposing sides of an apex R' of the cam follower crown radius R such that the first ball bearing 30 and the second ball bearing 60 axially abut one another under the apex R' to optimize load distribution. To accomplish this symmetry, the first clip 93 and the second clip 93B are secured about the shaft 90 such that first clip 93 and the second clip 93B are equidistant from the center axis B. This allows for equalization of load sharing by the first ball bearing 30 and the second ball bearing 60 for improved performance compared to prior art cam followers.

As shown in FIG. 1B, the shaft 90 includes a face 94 at the first axial end 91 perpendicular to the first axis of rotation A. The face 94 has a recessed hexagonal socket 95 configured to receive a hex wrench, or the like, for rotating the shaft 90 about the first axis of rotation A. The shaft 90 further includes a plurality of threads 97 on a radial outside surface 97A of the shaft 90. In this way, the shaft 90 can be received in a bore (not shown) comprising a complementary thread pattern or can similarly be received in a nut or the like having a complementary thread pattern. The shaft also included a hollow portion 98. This allows for weight reduction of shaft 90 for efficiency of operation, thus allowing additional mass of a tire 100, as described herein.

The first ball bearing 30 and the second ball bearing 60 are received in the tire 100. In some embodiments, the tire 100 is made from a metallic material. In one embodiment, the tire is made from steel. In a particular embodiment, the tire 100 is made from carburized steel and includes an optional black oxide coating for maximum wear resistance. It should be appreciated that in alternate embodiments different tire materials and different tire sizes are used for the tire 100. Further, the cam follower 10 is versatile in that in some embodiments the tires 100 are interchangeable with, for example, tires made of other metallic materials and tires made from elastomers, polymers or combinations thereof. The tire 100 has an exterior surface 110, which includes a crown radius R and an apex R'. The crown radius R is bowed about the center axis B, which is substantially perpendicular to axis A. The tire 100, includes a flange 112. Flange 112, in cooperation with the clip 93B, axially secures the first outer ring 40 and the second outer ring 70 to the tire 100 such that the tire is axially fixed to the first ball bearing 30 and the second ball bearing 60. As shown in FIG. 1B, tire 100 has a thickness T1. The exterior surface 110 of the tire 100 engages the cam (not shown) during operating of the necker in accordance with the present invention.

A pitch radius PR is defined as the distance between the midpoint of any one of the first plurality of rolling elements 54 and the axis A as shown in FIG. 1B. The pitch radius PR is also defined as the distance between the midpoint of any one of the second plurality of rolling elements 84 and the axis A as shown in FIG. 1B. The ratio of the thickness T1 of the tire 100 to the pitch radius PR (i.e., T1 divided by PR) is between about 0.18 and about 0.19. Further, the ratio of the depth D1 of the second groove 93C (that the second clip 93B is disposed in) to the thickness T1 of the tire 100 (i.e., D1 divided by T1) is between about 0.17 and about 0.19. The depth D1 of the second groove 93C is sized to provide a sufficient thickness of material to withstand axial forces and to axially retain the first outer ring 40 and the second outer ring 70 at a fixed axial position on the shaft 90 while allowing the first outer ring 40 and the second outer ring 70 to rotate around the shaft 90. The 0.17 and about 0.19 ratio of the depth D1 of the first groove 93C to the tire thickness T1 also allows for minimization of the weight of the (e.g. metallic) tire 100 while maintaining sufficient material thickness of the tire 100 to meet strength and wear requirements for the tire 100.

Figure 3:
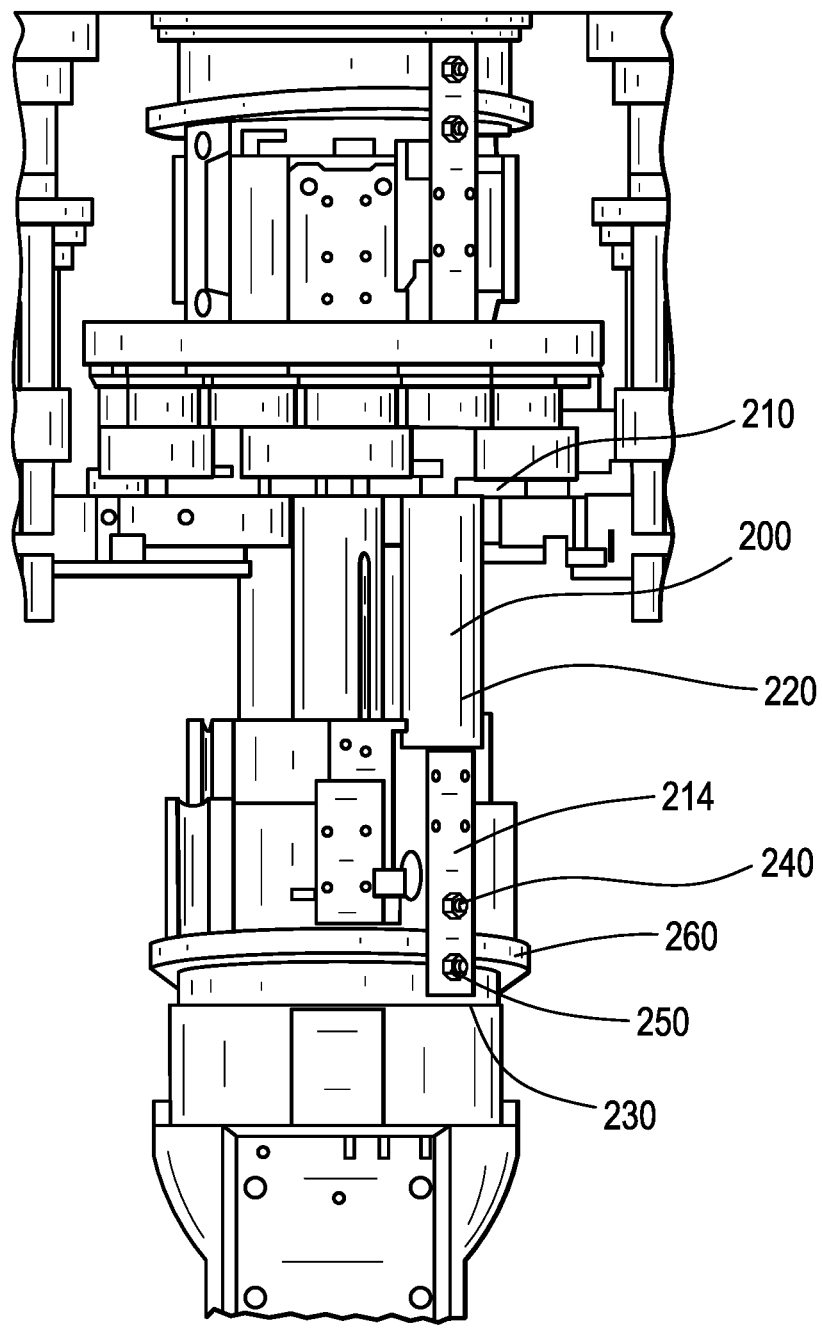
FIG. 3 is a perspective view of a necker machine ram in accordance with one embodiment of the present invention in which two cam followers are coupled thereto.
Figure 4:
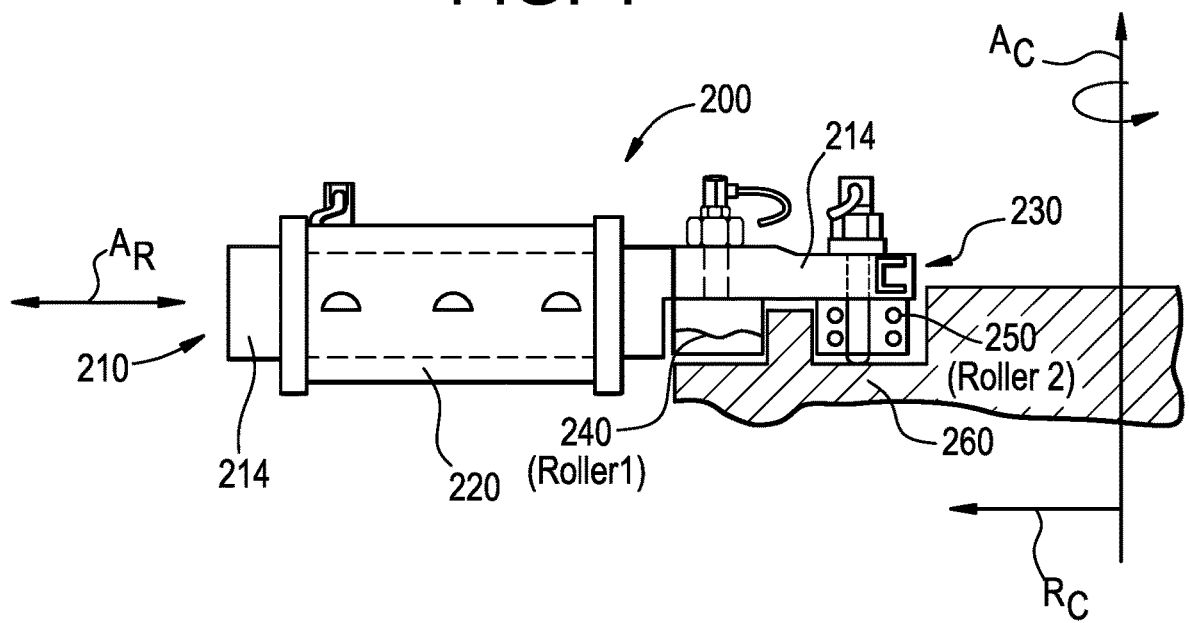
FIG. 4 is a front view of the necker machine ram shown in FIG. 3

In reference to FIGS. 3 and 4, a ram assembly 200 for a necker machine (not shown) in accordance with the present invention is shown. In such a can making necker machine, a cam follower rides on a rotating cam 260 with the rotational axis $A_C$ parallel to the surface of the cam 260. The ram assembly 200 extends between a first axial end 210 and a second axial end 230. The ram assembly 200 includes a fixed bushing 220 having a bore extending therethrough between the first axial end 210 and the second axial end 230. A ram piston 214 extends through both ends of the bore of the fixed bushing 220. Proximate to the second axial end of the ram 230, two cam followers (similar to the cam follower 10 illustrated in FIGS. 1A-C, 2 and described in detail herein) extend radially therefrom. Referring to FIG. 4, the cam followers 10, including a first roller 240 and a second roller 250, ride on a surface of a cam 260, with one roller 240, 250 located on each side of the cam 260, as the rollers rotate around the rotational axis of the cam $A_C$. The ram 214 is moved back and forth along the axis AR by the attached rollers 240, 250 in an accelerating and decelerating movement following a profile of the cam 260. Considerable radial force (i.e., force along the cam radial axis $R_C$) is developed on the rollers 240, 250 during the can necking operation.

Selection of the spherical ball (e.g. 54, 84) geometry for optimum service life via computer modeling of the bearing design was performed utilizing the load duty cycle of the necker machine as input. Necker machines can run 24 hours a day, 7 days a week and can process from about 2700 cans per minute to about 3000 cans per minute. Due to the unique geometry and corresponding efficiency, the instant cam follower design accommodates higher outputs of up to about 3350 cans per minute.

The geometry of the first ball bearing and the second ball bearing 60 is selected to yield maximum load capacity and to allow the end user to stipulate the outer diameter of the tire 100, as previously discussed. Specifically, the geometry of the rolling elements 54, 84, the inner rings 50, 80, and the outer rings 40, 70 are adjusted to minimize the internal clearance C1, C2 in the respective bearing 30, 60 thereby optimizing load distribution and service life. FIG. 1D depicts an internal clearance C1, C2 between the spherical ball 54 and the inner race 52 or outer race 42 of the first bearing 30. FIG. 1D is also representative of the first bearing 30', the second bearing 60', the third bearing 30", and the fourth bearing 60" as discussed herein with regards to FIG. 8A. Press fitting the interior surface 116 of the tire 100 over the outer rings 40, 70 adjusts the internal clearance C1, C2. Generally, ball bearings have an industry standard internal clearance or looseness, which is reduced by the interference press fit of the outer rings 40, 70 into the tire 100. By reducing this internal clearance C1, C2, more rolling elements 54, 84 within each bearing 30, 60 share the applied load, thereby increasing and optimizing the bearing life. In some embodiments, the internal clearance is between 0.0002 inches and 0.0008 inches. The applied load per duty cycle is discussed below with regards to FIGS. 5-7 and 10A-12. A distance R1 is defined by the distance from the exterior surface 44, 74 of the outer ring 40, 70 to the shaft axis A. A distance R2 is defined by the distance from shaft axis A to an interior surface 116 of the tire 100. The ratio of R1 to R2 is adjusted to optimize the load distribution. By maintaining a R1:R2 ratio between about 1.000 and about 1.015, improved load sharing and longer bearing life is realized.

Figure 5:
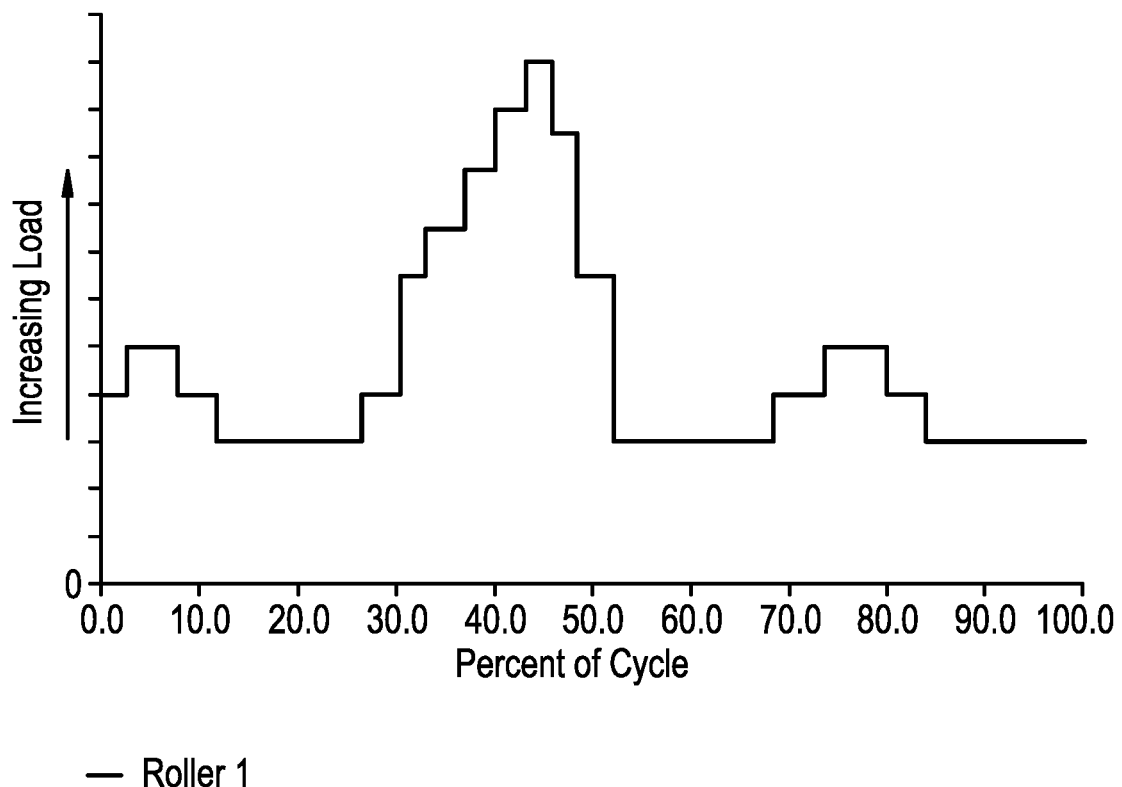
FIG. 5 is a duty cycle load chart for a first cam follower.
Figure 6:
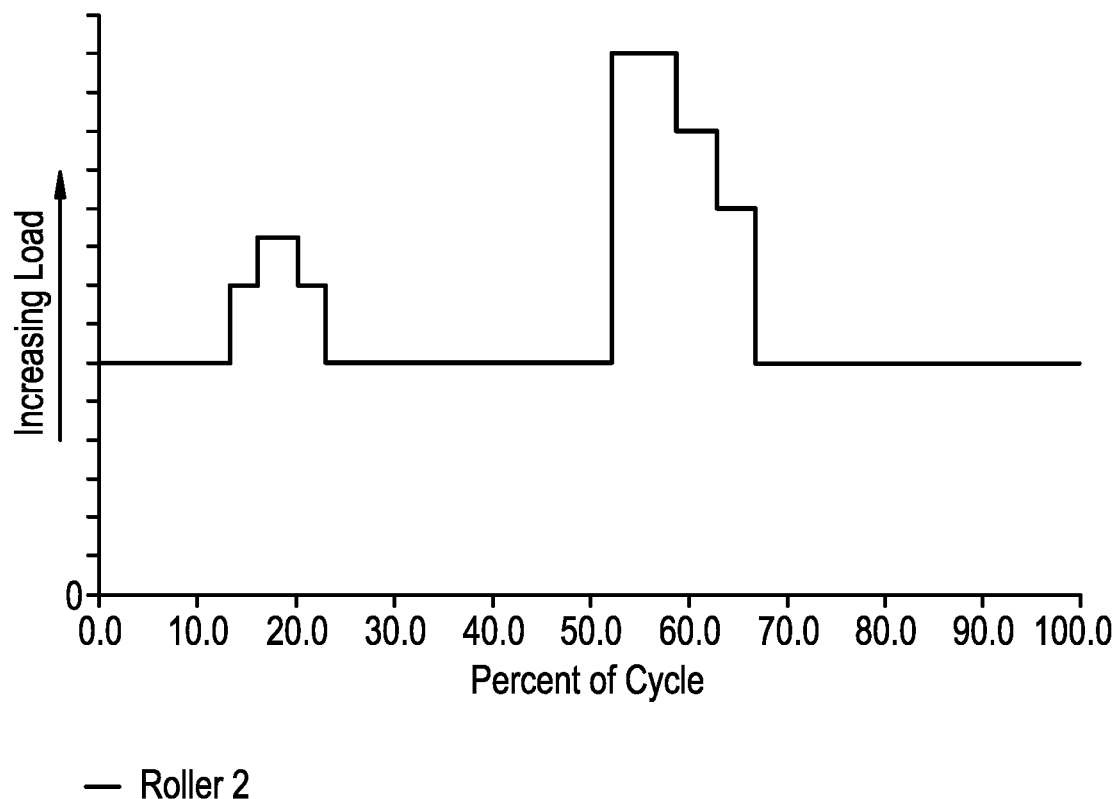
FIG. 6 is a duty cycle load chart for a second cam follower.

FIG. 5 depicts a duty cycle load chart for a first cam follower 1 ("Roller 1" in FIG. 4). FIG. 6 depicts a second duty cycle for a second cam follower 2 ("Roller 2" in FIG. 4). Roller 1 pushes a ram and a can into the work zone while roller 2 reacts the work load and returns the ram. Each duty cycle represents one revolution of the cam. The load is shown in the ordinate while the % of cycle is shown in the abscissa. With regard to FIG. 5, the peak load for roller 1 occurs at between about 40% and 50% of the duty cycle (i.e. between about 144 degrees and 180 degrees of the 360-degree duty cycle). Likewise, referring to FIG. 6, the peak load for roller 2 occurs at between about 50% and 60% of the duty cycle (i.e. between about 180 degrees and 216 degrees of the 360-degree duty cycle).

The resulting duty cycle life results for two rollers (e.g. 240, 250; see FIG. 4) are shown in FIG. 7. Roller 1 (240) and roller 2 (250) each have one of a ball bearing pairs identified as 6003 and 6202. The 6003 bearings are standard size, whereas the 6202 bearings are packed more tightly due to having smaller diameters. Thus, load sharing is improved and the life tests demonstrate significantly improved results. Unfactored life, factored life and full factored life are shown in hours. Unfactored life is the most conservative prediction (no lubrication or special materials), factored life includes vacuum degassed steel and less conservative regarding predicted life, whereas fully factored prediction includes the effects of lubrication and steel properties, a more realistic and less conservative prediction. As shown, the fully factored life prediction for roller 1 improved from 8,640 hours for bearing pair 6003 to 21,787 hours for bearing pair 6202. Likewise, an improvement from 23,600 hours (bearing pair 6003) to 60,482 hours (bearing pair 6202) was demonstrated for roller 2. Thus, a significant and unexpected improvement in bearing life expectancy for a maintenance free cam follower has been demonstrated herein.

Figure 8A:
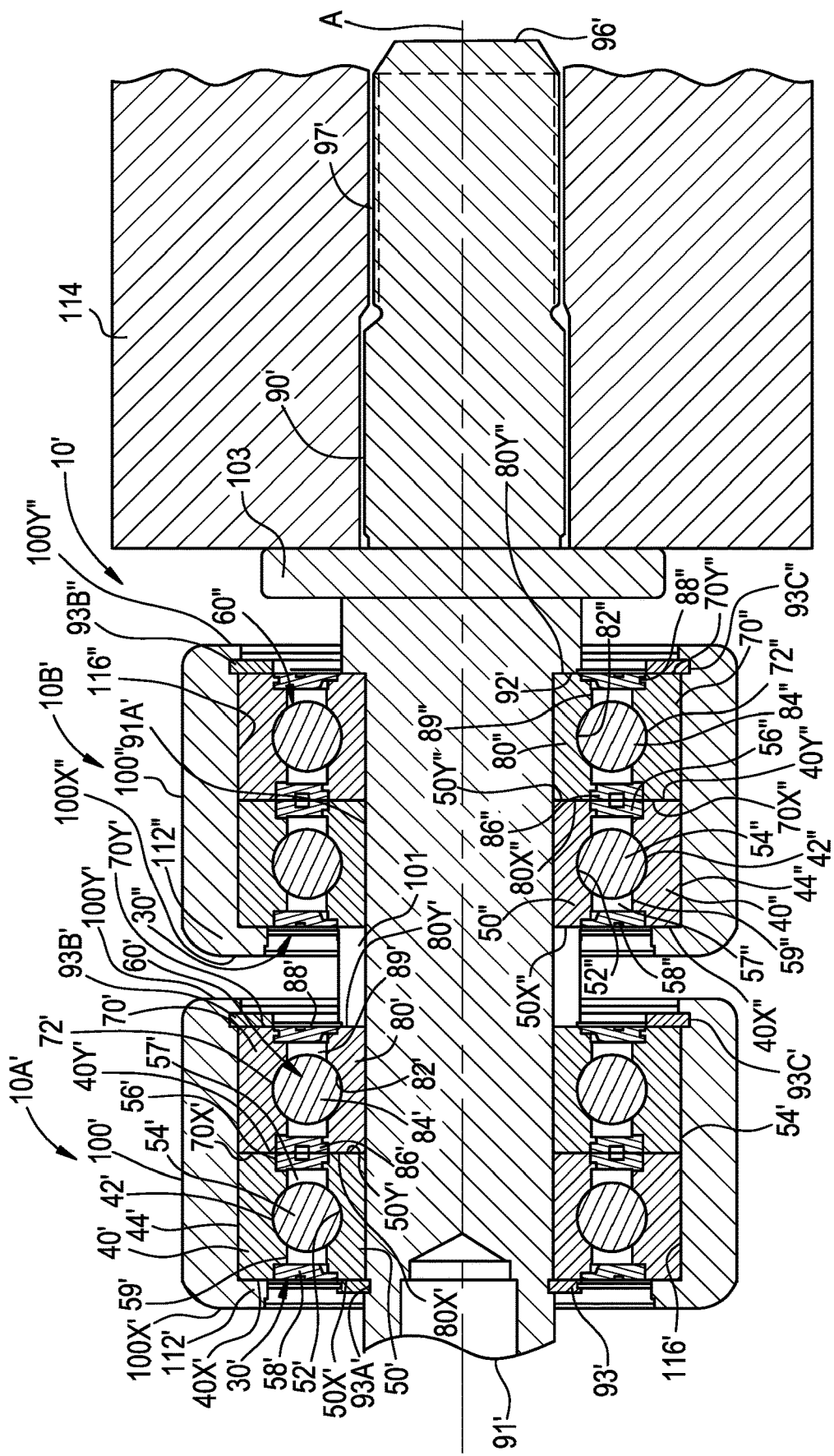
FIG. 8A is a partial cross-sectional view of a cam follower in accordance with another embodiment of the present invention.

An alternate embodiment includes two independently rotatable cam follower segments, for example first cam follower segment 10A' and second cam follower segment 10B', as depicted in FIG. 8A. The first cam follower segment 10A' and the second cam follower segment 10B' are mounted on a shaft 90' that extends from a first axial shaft end 91' to a second axial shaft end 96'. The shaft 90' has a first groove 93A' proximate to the first axial shaft end 91'. The shaft 90' has a shoulder 92' formed thereon between the first groove 93A' and the second axial shaft end 96'. A first clip 93' is radially engaged in the first groove 93A'.

The first cam follower segment 10A' contains a first ball bearing 30' and a second ball bearing 60'. The first ball bearing 30' includes a first inner ring 50' and a first outer ring 40'. A plurality of rolling elements in the form of a first plurality of spherical balls 54' is disposed between the first inner ring 50' and the first outer ring 40'. A first seal 58' extends radially between an axial end 50X' of the first inner ring 50' and an axial end 40X' of the first outer ring 40'. A second seal 56' extends radially between an axial end 50Y' of the first inner ring 50' and an axial end 40Y' of the first outer ring 40'. The first seal 58', the second seal 56', an outer surface of the first inner ring 50', and an inner surface of the first outer ring 40' define a first annular cavity 59'. The first plurality of spherical balls 54' are retained radially between a first inner race 52' of the first inner ring 50' and a first outer race 42' of the first outer ring 40'.

The second ball bearing 60' includes a second inner ring 80' and a second outer ring 70'. A plurality of rolling elements in the form of a second plurality of spherical balls 84' is disposed between the second inner ring 80' and the second outer ring 70'. A third seal 86' extends radially between an axial end 80X' of the second inner ring 80' and an axial end 70X' of the second outer ring 70'. A fourth seal 88' extends radially between an axial end 80Y' of the second inner ring 80' and an axial end 70Y' of the second outer ring 70'. The third seal 86', the fourth seal 88', an outer surface of the second inner ring 80', and an inner surface of the second outer ring 70' define a second annular cavity 89'. The second plurality of spherical balls 84' are retained radially between a second inner race 82' of the second inner ring 80' and a second outer race 72' of the second outer ring 70'.

In the embodiment depicted in FIG. 8A, the second axial shaft end 96' engages a complementary bore in the housing 114. A cylindrical shank surface 91A' of the shaft 90' is defined between the first groove 93A' and the shoulder 92' of the shaft 90'. A first tire 100' wraps around the first ball bearing 30' and the second ball bearing 60'. A first flange 112' extends radially inward from a first axial tire end 100X' of the first tire 100' and a second groove 93C' interrupts (e.g., extends radially outward into the tire and circumferentially therearound) a radially inward surface of the first tire 100' proximate to a second axial tire end 100Y' of the first tire 100'. The first flange 112' axially abuts the axial end 40X' of the first outer ring 40' and a second clip 93B', radially engaging the second groove 93C', axially abuts the axial end 70Y' of the second outer ring 70'. An axial end 50X' of the first inner ring 50' axially abuts the first clip 93' and an axial end 80Y' of the second inner ring 80' axially abuts a spacer 101.

Figure 8B:
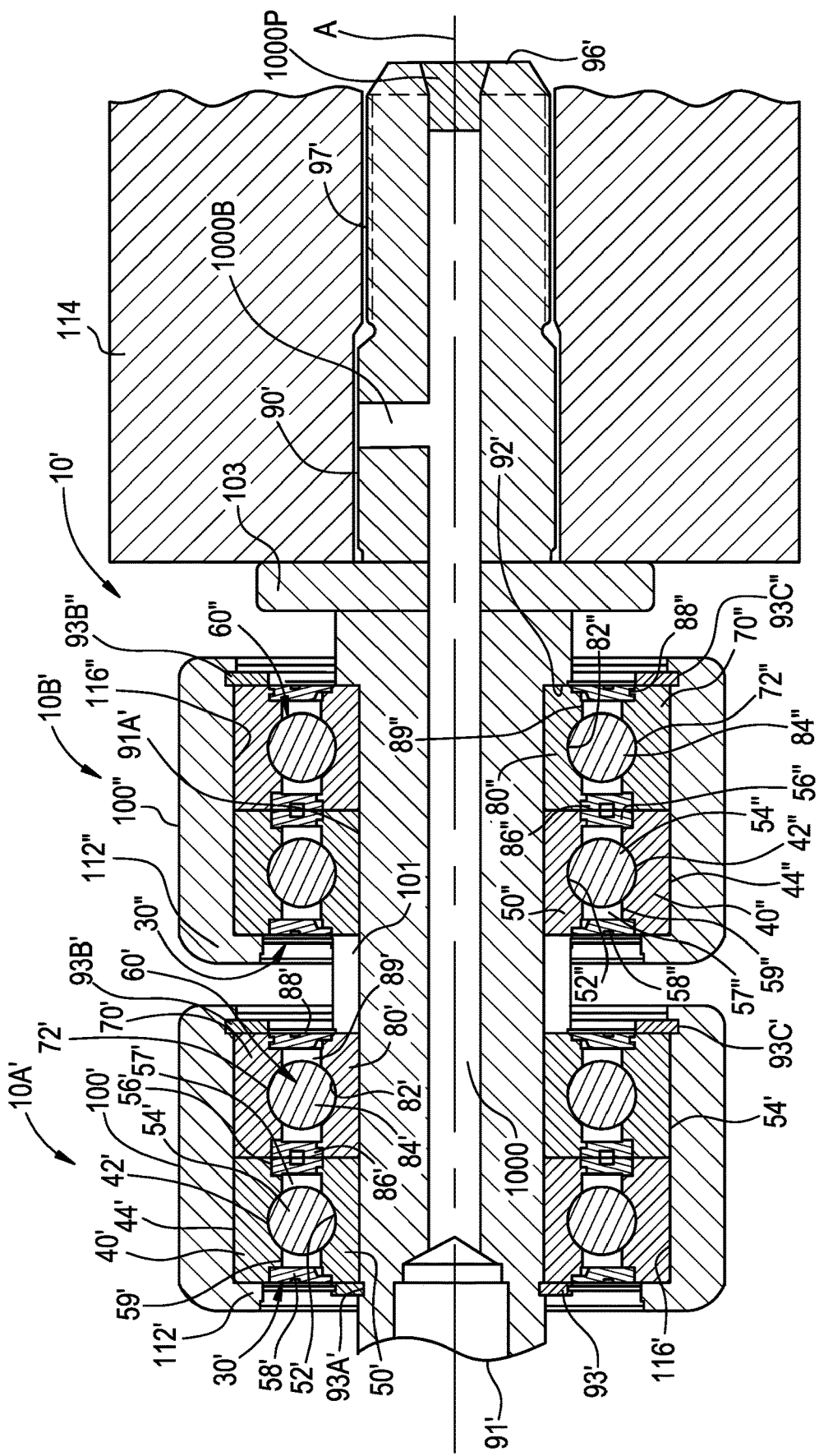
FIG. 8B is a partial cross-sectional view of a cam follower of FIG. 8A and having a lubrication passage therein.

In one embodiment, shown in FIG. 8B, the shaft 90 includes a lubrication passage 1000 extending axially therethrough and having a branch connection 1000B extending radially outward therefrom. A plug 1000P is removably secured in the passage 1000, proximate the second end 96 of the shaft for sealing the passage 1000. The branch connection 1000B is configured for lubricating the housing 114 of portions of the necker machine. A grease fitting, such as a Zerk fitting (not depicted), is incorporated into the first axial shaft end 91' to supply grease to the lubrication passage 1000.

The second cam follower segment 10B' contains a third ball bearing 30" and a fourth ball bearing 60". The third ball bearing 30" includes a third inner ring 50" and a third outer ring 40". A plurality of rolling elements in the form of a third plurality of spherical balls 54" is disposed between the third inner ring 50" and the third outer ring 40". A fifth seal 58" extends radially between an axial end 50X" of the third inner ring 50" and an axial end 40X" of the third outer ring 40". A sixth seal 56" extends radially between an axial end 50Y" of the third inner ring 50" and an axial end 40Y" of the third outer ring 40". The fifth seal 58", the sixth seal 56", an outer surface of the third inner ring 50", and an inner surface of the third outer ring 40" define a third annular cavity 59". The third plurality of spherical balls 54" are retained radially between a third inner race 52" of the third inner ring 50" and a third outer race 42" of the third outer ring 40".

The fourth ball bearing 60" includes a fourth inner ring 80" and a fourth outer ring 70". A plurality of rolling elements in the form of a fourth plurality of spherical balls 84" is disposed between the fourth inner ring 80" and the fourth outer ring 70". A seventh seal 86" extends radially between an axial end 80X" of the fourth inner ring 80" and an axial end 70X" of the fourth outer ring 70". An eighth seal 88" extends radially between an axial end 80Y" of the fourth inner ring 80" and an axial end 70Y" of the fourth outer ring 70". The seventh seal 86", the eighth seal 88", an outer surface of the fourth inner ring 80", and an inner surface of the fourth outer ring 70" define a fourth annular cavity 89". The fourth plurality of spherical balls 84" are retained radially between a fourth inner race 82" of the fourth inner ring 80" and a fourth outer race 72" of the fourth outer ring 70". The axial end 80X" of the fourth inner ring 80" axially abuts the axial end 50Y" of the third inner ring 50" and the axial end 80Y" of the fourth inner ring 80" axially abuts the shoulder 92'. A second tire 100" wraps around the third ball bearing 30" and the fourth ball bearing 60". A second flange 112" extends radially inward from a third axial tire end 100X" of the second tire 100" and a third groove 93C" interrupts an inner surface of the second tire 100" proximate to a fourth axial tire end 100Y". The second flange 112" axially abuts the axial end 40X" of the third outer ring 40" and a third clip 93B", radially engaging the third groove 93C", axially abuts the axial end 70Y" of the fourth outer ring 70". An axial end 50X" of the third inner ring 50" axially abuts the spacer 101 and an axial end 80Y" of the fourth inner ring 80" axially abuts the shoulder 92'. The spacer 101 is disposed on the shaft 90' between and abutting the second inner ring 80' and the third inner ring 50". The first inner ring 50', second inner ring 80', the spacer 101, the third inner ring 50" and the fourth inner ring 80" are axially fixed to the shaft 90' by the first clip 93' and the shoulder 92.

In the embodiment depicted in FIG. 8A, the first cam follower segment 10A' is spaced apart from the second cam follower segment 10B' by the spacer 101. An axial stackup is defined as the total axial length of the first inner ring 50', the second inner ring 80', the spacer 101, the third inner ring 50", and the fourth inner ring 80". The axial stackup is axially retained by the first clip 93A' engaging the first groove 93A' at one axial end and the shoulder 92' at an opposite axial end.

In the embodiment depicted in FIG. 8A, the first seal 56' is fixed to the first outer ring 40', the third seal 86' is fixed to the second outer ring 70', the fifth seal 58" is fixed to the third outer ring 40", and the seventh seal 86" is fixed to the fourth outer ring 70". The second seal 56' is fixed to the first outer ring 40', the fourth seal 88' is fixed to the second outer ring 70', the sixth seal 54" is fixed to the third outer ring 40", and eighth seal 88" is fixed to the fourth outer ring 70". While each of the seals is fixed to the respective outer ring, fixing each of the seals to the respective inner ring does not depart from the scope of the present disclosure.

In the embodiment depicted in FIG. 8A, the geometry of the bearings 30', 60', 30", 60" is also selected to yield maximum load capacity for the end user's stipulated outer diameter of the tire 100', 100". The optimum load distribution and service life is obtained by controlling the internal clearance by press fitting the first tire 100' over the first outer ring 40' of the first bearing 30' and the second outer ring 70' of the second bearing 60' and by press fitting the second tire 100" over the third outer ring 40" of the third bearing 30" and over the fourth outer ring 70" of the fourth bearing 60".

Figure 9:
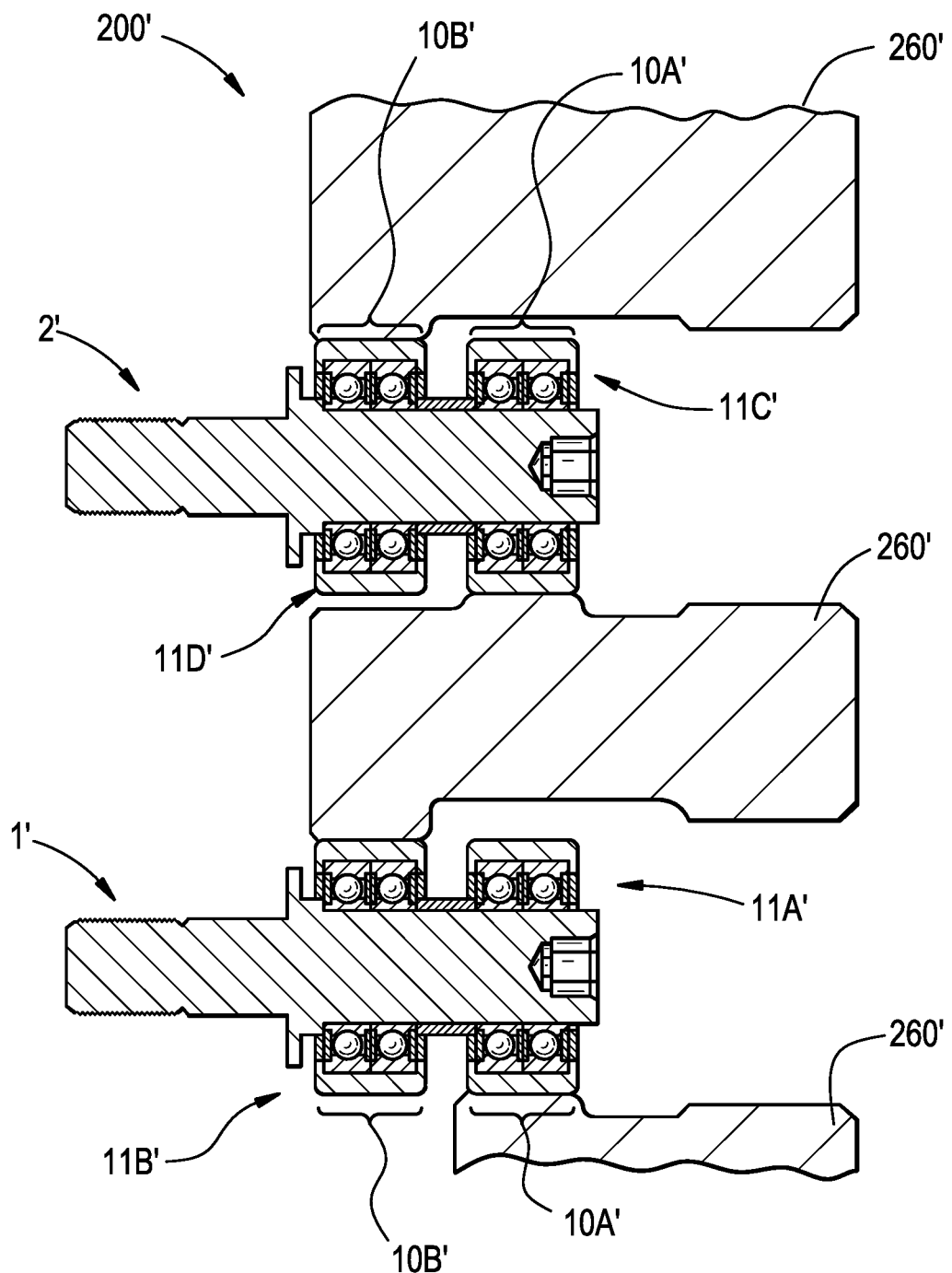
FIG. 9 is a partial cross-sectional view of a necker machine ram in accordance with another embodiment of the present invention in which two cam followers are coupled thereto.

In reference to FIGS. 9-12, an alternate embodiment of a ram assembly 200' for a necker machine has an inner follower 1' and an outer follower 2'. FIG. 9 depicts the inner follower 1' and the outer follower 2' riding on a rotating cam 260'. The inner follower 1' includes an outboard roller at a location marked with the arrow 11A' in the form of the first cam follower segment 10A' and an inboard roller at a location marked with the arrow 11B' in the form of the second cam follower segment 10B'. The outer follower 2' includes an outboard roller at a location marked with the arrow 11C' in the form of the first cam follower segment 10A' and an inboard roller at a location marked with the arrow 11D' in the form of second cam follower segment 10B'. In the embodiment depicted in FIG. 9, the first cam follower segments 10A' and the second cam follower segments 10B' engage opposing surfaces of the rotating cam 260'.

Figure 10A:
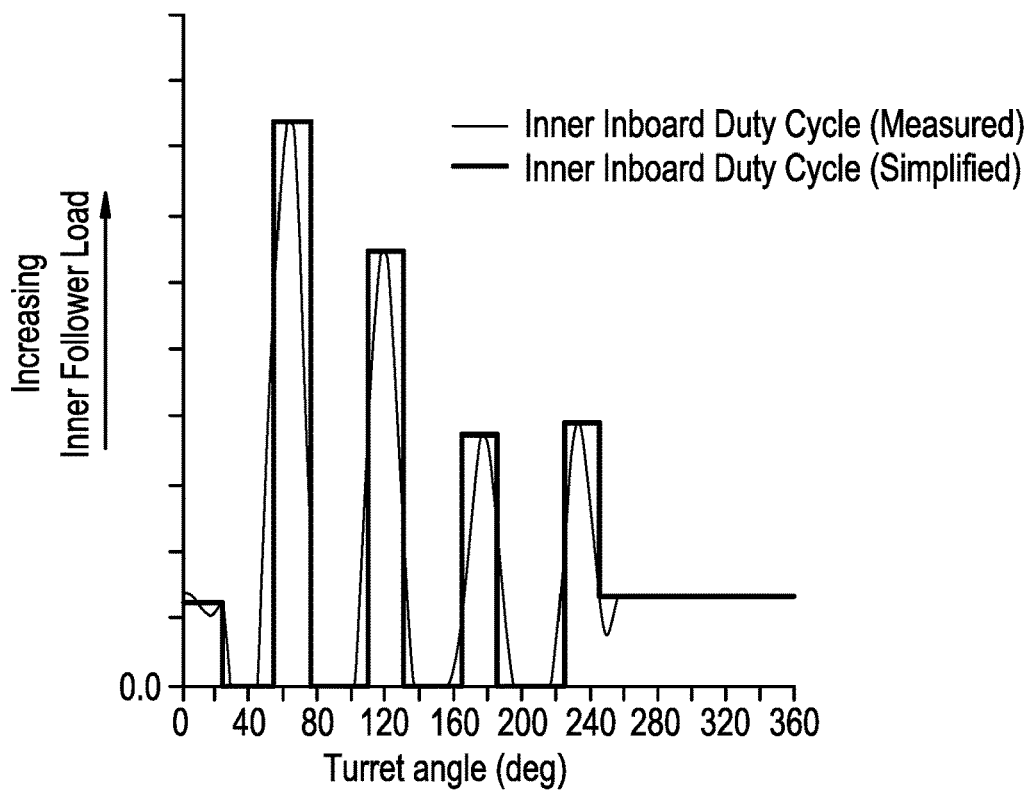
FIG. 10A is a duty cycle load chart for an inner inboard cam follower of the embodiment depicted in FIG. 9.
Figure 10B:
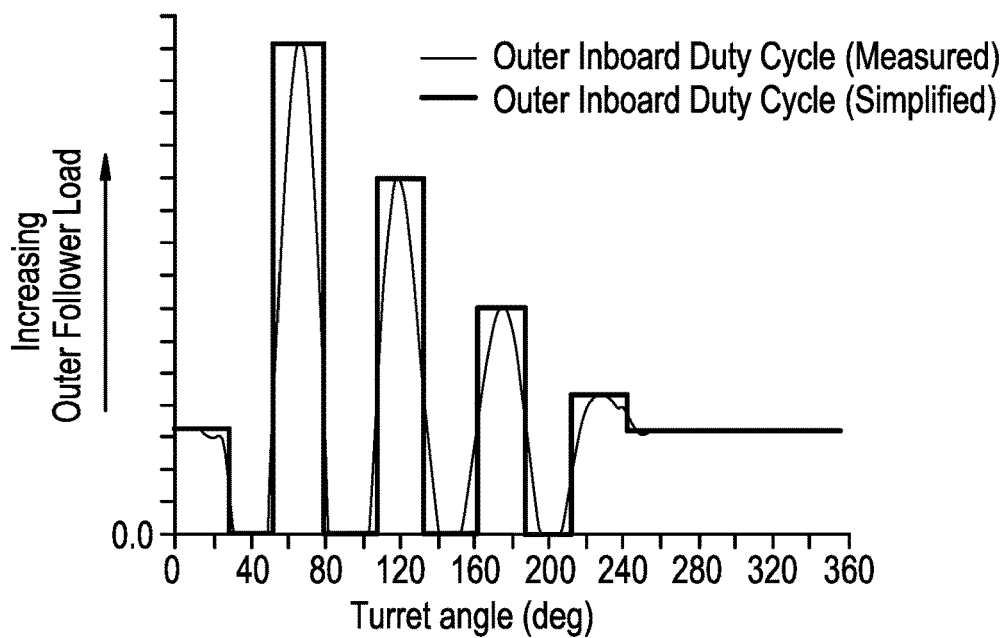
FIG. 10B is a duty cycle load chart for an outer inboard cam follower of the embodiment depicted in FIG. 9.
Figure 11A:
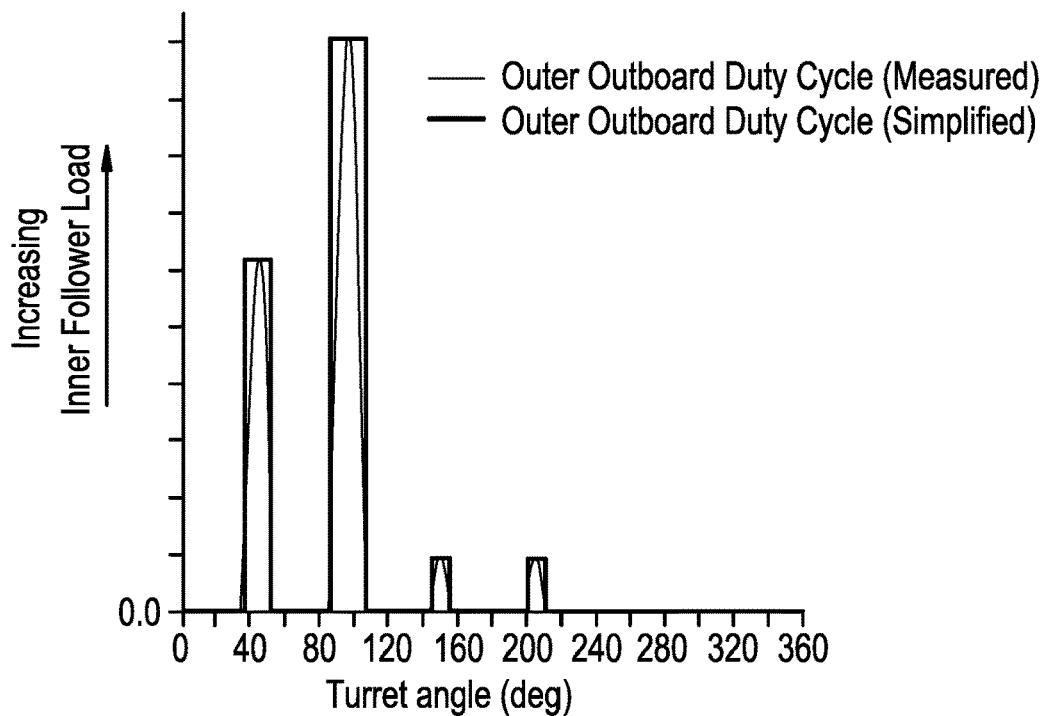
FIG. 11A is a duty cycle load chart for an outer outboard cam follower of the embodiment depicted in FIG. 9.
Figure 11B:
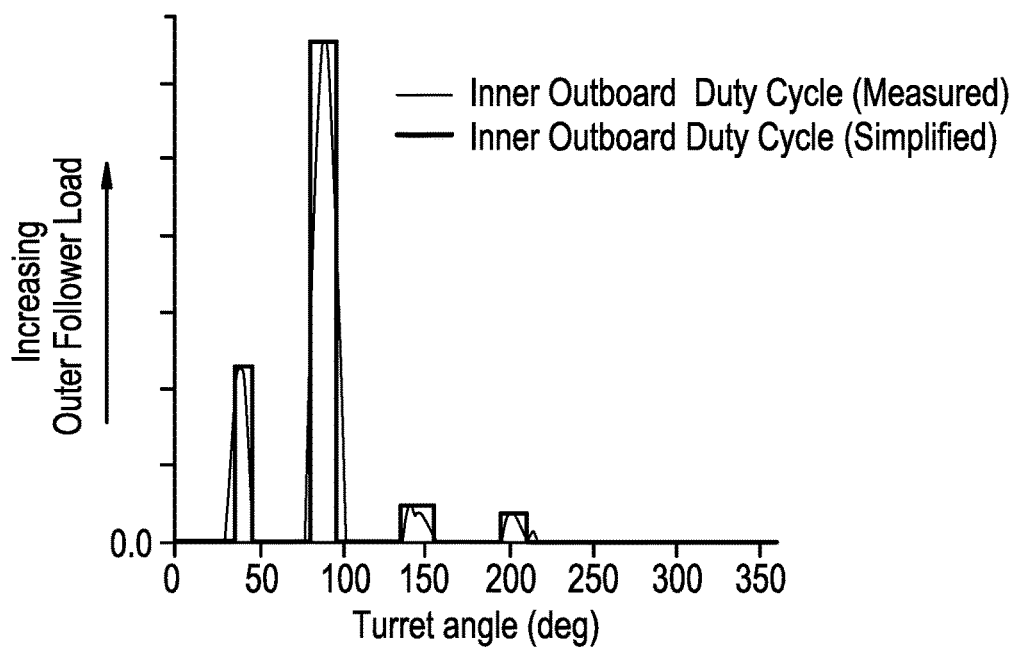
FIG. 11B is a duty cycle load chart for an inner outboard cam follower of the embodiment depicted in FIG. 9.

In FIGS. 10A, 10B, 10C and 10D the increasing load is shown in the ordinate while the turret angle in degrees (e.g., cycle) is shown in the abscissa. FIG. 10A depicts the duty cycle load chart for the inboard roller or second tire 10B' of the inner follower 1' wherein measured values of the inner inboard load as a function of turret angle is shown in the light solid line and the simplified inner inboard duty cycle is shown in the solid bold line. The simplified inner inboard duty cycle provides an efficient manner to analyze and/or utilize the measured inner inboard duty cycle and simplifies the life calculations. FIG. 10B depicts the duty cycle load chart for the inboard roller or fourth tire 10D' of the outer follower 2' wherein measured values of the outer inboard load as a function of turret angle is shown in the light solid line and the simplified outer inboard duty cycle is shown in the solid bold line. The simplified outer inboard duty cycle provides an efficient manner to analyze and/or utilize the measured outer inboard duty cycle and simplifies the life calculations. FIG. 11A depicts the duty cycle load chart for the outboard roller or third tire 10C' of the outer follower 2' wherein measured values of the outer outboard load as a function of turret angle is shown in the light solid line and the simplified outer outboard duty cycle is shown in the solid bold line. The simplified outer outboard duty cycle provides an efficient manner to analyze and/or utilize the measured outer outboard duty cycle and simplifies the life calculations. FIG. 11B depicts the duty cycle load chart for the outboard roller or first tire 10A' of the inner follower 1' wherein measured values of the inner outboard load as a function of turret angle is shown in the light solid line and the simplified inner outboard duty cycle is shown in the solid bold line. The simplified inner outboard duty cycle provides an efficient manner to analyze and/or utilize the measured inner outboard duty cycle and simplifies the life calculations.

The resulting duty cycle life results for the rollers evaluated in FIGS. 10A-11B are shown in FIG. 12. For the outer inboard roller or tire 10D', FIG. 12 illustrates an individual ball bearing life of 52,610 hours and a roller assembly life of 28,193 hours for a roller speed of 5110 rotations per minute (RPM). For the outer outboard roller or tire 10C', FIG. 12 illustrates an individual ball bearing life of 294,860 hours and a roller assembly life of 138,010 hours for a roller speed of 5110 rotations per minute (RPM). For the inner inboard roller or tire 10B', FIG. 12 illustrates an individual ball bearing life of 464,150 hours and a roller assembly life of 248,730 hours for a roller speed of 3725 rotations per minute (RPM). For the inner outboard roller or tire 10A', FIG. 12 illustrates an individual ball bearing life of 2,072,500 hours and a roller assembly life of 1,110,600 hours for a roller speed of 3725 rotations per minute (RPM).

Figure 13A:
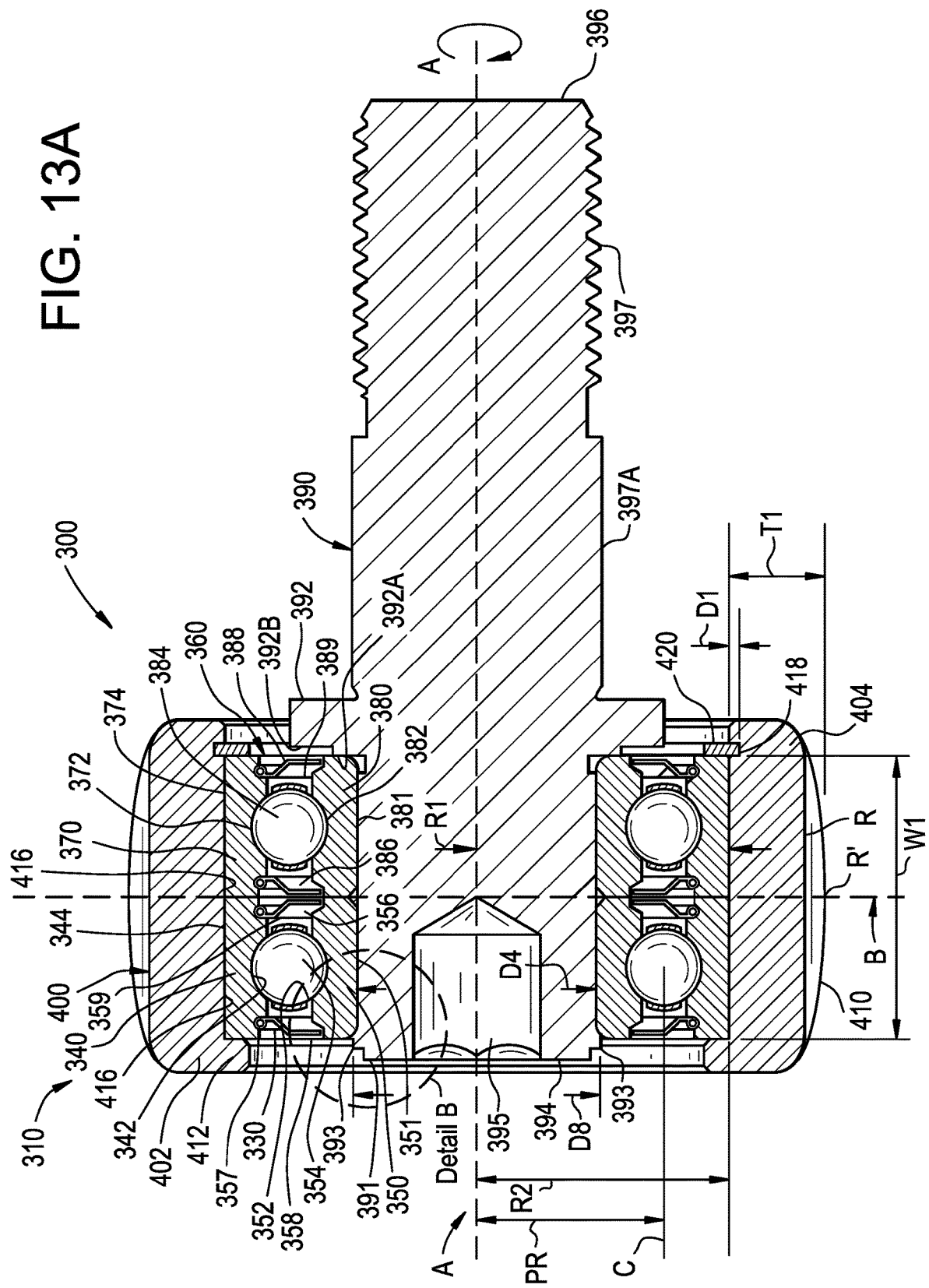
FIG. 13A is a cross-sectional view of a cam follower in accordance with one embodiment of the present invention.

FIGS. 13A-B depict an axial retainment system 300 having a cam follower 310 for a ram of a necker machine according to an alternative embodiment of the present invention. As shown in FIG. 13A, the cam follower 310 includes a first ball bearing 330 and a second ball bearing 360. The first ball bearing 330 and the second ball bearing 360 are configured in a tandem configuration. That is, they are positioned axially side to side, coaxially with a first axis of rotation A. In the embodiment shown, an inner ring 350 of the first ball bearing 330 and an inner ring 380 of the second ball bearing 360 are axially and radially fixed relative to each other about the first axis of rotation A.

As shown in FIG. 13A, the first ball bearing 330 includes a first outer ring 340 that has a first outer race 342 (also referred to as a bearing surface) and a first exterior surface 344. The first ball bearing 330 further includes the first inner ring 350 which has a first inner race 352 (also referred to as a bearing surface). The first inner ring 350 is coaxially disposed in the first outer ring 340. A first plurality of rolling elements 354 are disposed between the first outer race 342 and the first inner race 352. The first plurality of rolling elements 354 are, for example, spherical balls. The first plurality of rolling elements 354 are in rolling engagement with the first outer race 342 and the first inner race 352 such that the first outer ring 340 is rotatable relative to the first inner ring 350 about the first axis of rotation A.

As shown in FIG. 13A, the first ball bearing 330 includes a second seal 356 extending radially between the first outer ring 340 and the first inner ring 350 on one side of the first plurality of rolling elements 54. The first ball bearing 330 further includes a first seal 358 that extends radially between the first outer ring 340 and the first inner ring 350 such that the first plurality of rolling elements 354 is sealingly positioned between the first seal 358 and the second seal 356. The first seal 358 and the second seal 356 are configured to retain a lubricant 357 inside an annular cavity 359 formed between the first outer race 342 and the first inner race 352 in which the first plurality of rolling elements 354 is disposed. The seals 356, 358 are made of a molded nitrile rubber, however, as can be appreciated by a person having ordinary skill in the art and familiar with this disclosure, the seals 356, 358, also referred to as shields, can employ different materials in alternate embodiments.

The lubricant 357 is selected to be maintenance free and to function for the useful life of the cam follower 310. In some embodiments, the lubricant 357 is a general-purpose wide temperature range grease having anti-oxidation and anti-wear properties.

In the embodiment disclosed in FIG. 13A, the second ball bearing 360 is similar in configuration to the first ball bearing 330. The second ball bearing 360 includes a second outer ring 370 that has a second outer race 372 (also referred to as a bearing surface) and a second exterior surface 374. The second ball bearing 360 further includes a second inner ring 380 that has a second inner race 382 (also referred to as a bearing surface). The second inner ring 380 is coaxially disposed in the second outer ring 370. A second plurality of rolling elements 384 are disposed between the second outer race 372 and the second inner race 382. The second plurality of rolling elements 384 are, for example, spherical balls. The second plurality of rolling elements 384 are in rolling engagement with the second outer race 372 and the second inner race 382 such that the second outer ring 370 is rotatable relative to the second inner ring 380 about the first axis of rotation A.

As shown in FIG. 13A, the second ball bearing 360 includes a third seal 386 that extends radially between the second outer ring 370 and the second inner ring 380 on one side of the second plurality of rolling elements 384. The second bearing 360 further includes a fourth seal 388 that extends radially between the second outer ring 370 and the second inner ring 380 such that the second plurality of rolling elements 384 are sealingly positioned between the third seal 386 and the fourth seal 388. The seals 386, 388 are configured to retain the lubricant 357 inside an annular cavity 389 formed between the second outer race 372 and the second inner race 382. The second plurality of rolling elements are disposed in the annular cavity 389. The seals 386, 388 are made of a molded nitrile rubber, however, as can be appreciated by a person having ordinary skill in the art and being familiar with this disclosure, the seals 386, 388, also referred to as shields, can employ different materials in alternate embodiments.

In reference to the embodiment shown in FIGS. 13A-B, although the cam follower 310 is shown having a first ball bearing 330 and a second ball bearing 360, the present invention is not limited in this regard and, as will be appreciated by a person of ordinary skill in the art, many different configurations may be employed. For example, the present invention is practiced using a cam follower having a single row of roller or ball bearings. Or, for example, in one embodiment the present invention is practiced using a cam follower having a ball bearing wherein a single continuous outer ring defines a first outer race and a second outer race, and a single continuous inner ring defines a first inner raceway and a second inner raceway.

In the embodiment shown in FIGS. 13A-B, the outer ring 340, the outer ring 370, the inner ring 350, and/or the inner ring 380 are manufactured from a 52100 steel that is through hardened. The first plurality of rolling elements 354 and the second plurality of rolling elements 384 also are manufactured from a 52100 steel. As discussed herein regarding FIG. 1C, which is also representative of the first bearing 330 and the second bearing 360 of the cam follower 310 shown and discussed herein regarding FIG. 13A, each of the first plurality of rolling elements 354 are separated by a cage 99; and each of the second plurality of rolling elements 384 are separated by another cage 99. The cages 99 are manufactured from a low carbon soft steel. It should be understood that the present invention is not limited to using the cage 99 to separate adjacent rolling elements 354 from one another and another cage 99 to separate adjacent rolling elements 384, as different spacers, or no spacers, may be employed between the balls in the first plurality of rolling elements 354 and as different spacers, or no spacers, may be employed between the balls in the second plurality of rolling elements 384. It should also be understood that the present invention is not limited to balls, as other types of rolling elements may be employed with the present invention, for example, needle rollers.

Although specific materials are disclosed herein, a person of ordinary skill in the art and familiar with this disclosure will understand that the present invention is not limited in this regard, and that other materials may be used with the present invention.

In reference to FIGS. 13A-B, the first inner ring 350 has a first bore 351 extending therethrough, and the second inner ring 380 has a second bore 381 extending therethrough. A shaft 390 is received through the first bore 351 and the second bore 381. The shaft 390 is press fit in the first bore 351 and the second bore 381 such that the first inner ring 350 and the second inner ring 380 are fixed relative to the shaft about the first axis of rotation A. The shaft 390 (also referred to as a stud) extends between a first axial end 391 (also referred to as an outboard end) and a second axial end 396 (also referred to as an inboard end). The shaft 390 has a swaged ridge 393 formed thereon. The swaged ridge 393 extends radially outward from the shaft 390 and circumferentially around the shaft 390 (e.g., continuously around). The swaged ridge 393 is located proximate the first axial end 391 of the shaft 390.

As shown in FIG. 13A, the first ball bearing 330 and the second ball bearing 360 axially abut one another and are received on the shaft 390 proximate to the first axial end 391, thereof. The shaft 390 has a flange 392 projecting radially outward from the shaft 390. The flange 392 is located between the first axial end 391 and the second axial end 396. The flange 392 extends radially outward from the shaft 390 and circumferentially around the shaft 390 (e.g., continuously around). The flange 392 has an outboard axial surface 392B having a shoulder 392A extending axially outward therefrom toward the first axial end 391. Once assembled, the second inner ring 380 abuts the shoulder 392A to inhibit axial movement of the ball bearings 330, 360 relative to the shaft 390. The first inner ring 350 abuts an inboard axial surface 393B of the swaged ridge 393, such that the first inner ring 350 of first ball bearing 330 and the second inner ring 380 of the second ball bearing 360 are disposed, compressed, and retained axially between the swaged ridge 393 and the shoulder 392A.

As shown in FIG. 13A, a tire 400 extends circumferentially around the first outer ring 340 and the second outer ring 370. A groove 418 is formed in tire 400 proximate an inboard axial end 404 thereof. The groove 418 extends circumferentially around and radially outward into the tire 400. The groove 418 is located proximate an inner axial end of the second outer ring 370. An outboard axial end 402 of the tire 400 has a radially inward projecting flange 412 located proximate an outboard axial end of the first outer ring 340 proximate to the first axial end 391 of the shaft 390. A clip 420 is seated in the groove 418 to axially retain first outer ring 340 and the second outer ring 370 between the clip 420 and the flange 412 and to inhibit axial movement of the ball bearings 330, 360 relative to the shaft 390. The swaged ridge 393 engages the inner ring 350 of the first ball bearing 330 to axially secure the first ball bearing 330 on the shaft 390 and clip 420 engages the outer ring 370 of the second ball bearing 360 to axially secure the second ball bearing 360 to the tire 400. The second inner ring 380 abuts the shoulder 392A of the shaft 390 such that the first inner ring 350 and the second inner ring 380 are fixed relative to one another and fixed relative to the A axis along the shaft 390. The first ball bearing 330 and the second ball bearing 360 are located symmetrically on opposing sides of an apex R' of the cam follower crown radius R such that the first ball bearing 330 and the second ball bearing 360 axially abut one another under the apex R' to optimize load distribution. To accomplish this symmetry, the swaged ridge 393 and the clip 420 are positioned about the shaft 390 such that the swaged ridge 393 and the clip 420 are equidistant from the center axis B. This allows for equalization of load sharing by the first ball bearing 330 and the second ball bearing 360 for improved performance compared to prior art cam followers.

Figure 15A:
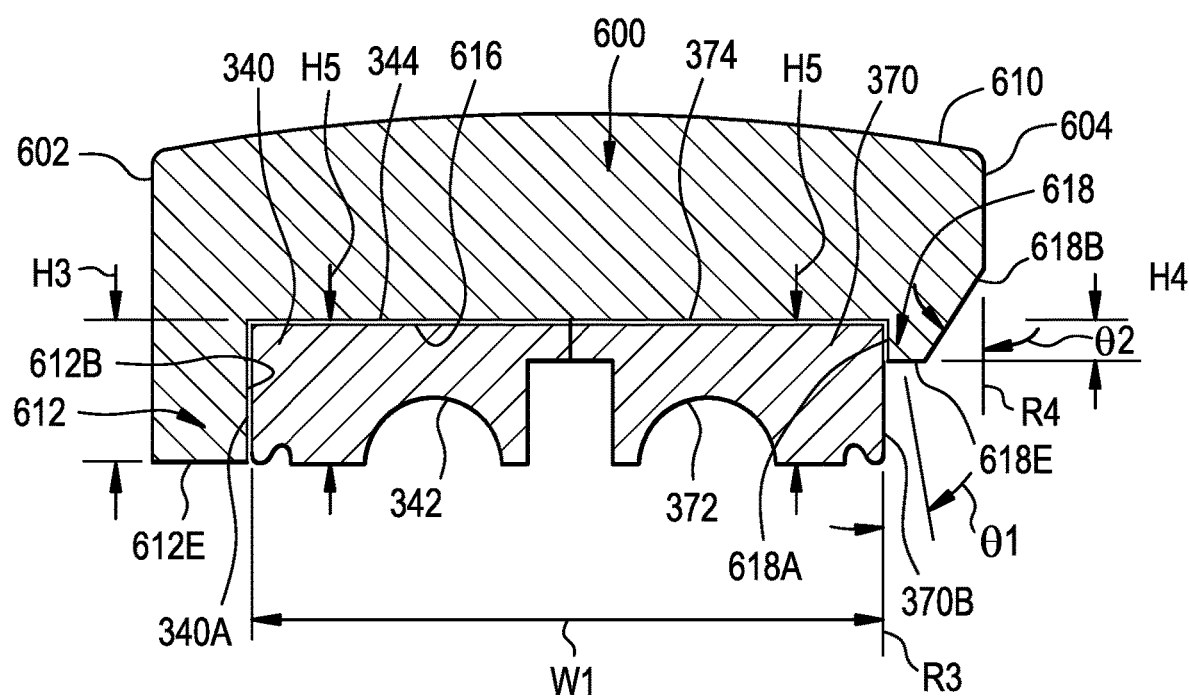
FIG. 15A is an enlarged view of a portion of a tire and the bearing outer rings in accordance with one embodiment of the present invention.

As shown in FIGS. 15A, a tire 600 according to an alternative embodiment of the present invention extends circumferentially around the first outer ring 340 and the second outer ring 370. An outboard axial end 602 of the tire 600 has a radially inward projecting flange 612 located proximate an outboard axial end 340A of the first outer ring 340. An inboard axial end 604 of the tire 600 has an angled abutment shoulder 618 proximate an inboard axial end 370B of the second outer ring 370. The tire 600 has an interior surface 616 extending between the flange 612 and the angled abutment shoulder 618.

As shown in FIG. 15A, the flange 612 has a first radial length H3 as measured from the interior surface 616 to a radially inward facing surface 612E of the flange 612. The angled abutment shoulder 618 has a second radial length H4 as measured from the interior surface 616 to a radially inward facing surface 618E. In some embodiments, the first radial length H3 is about equal to an annular thickness H5 of the first outer ring 340 and the second outer ring 370. In some embodiments, the second radial length H4 is less than the first radial length H3. In some embodiments, the second radial length H4 is less than about 25% of the first radial length H3. In some embodiments, the second radial length H4 is less than about 15% of the first radial length H3. In some embodiments, the second radial length H4 is less than about 5% of the first radial length H3. In some embodiments, the second radial length H4 is less than the annular thickness H5. In some embodiments, the second radial length H4 is less than about 25% of the annular thickness H5. In some embodiments, the second radial length H4 is less than about 15% of the annular thickness H5. In some embodiments, the second radial length H4 is less than about 5% of the annular thickness H5.

Figure 15B:
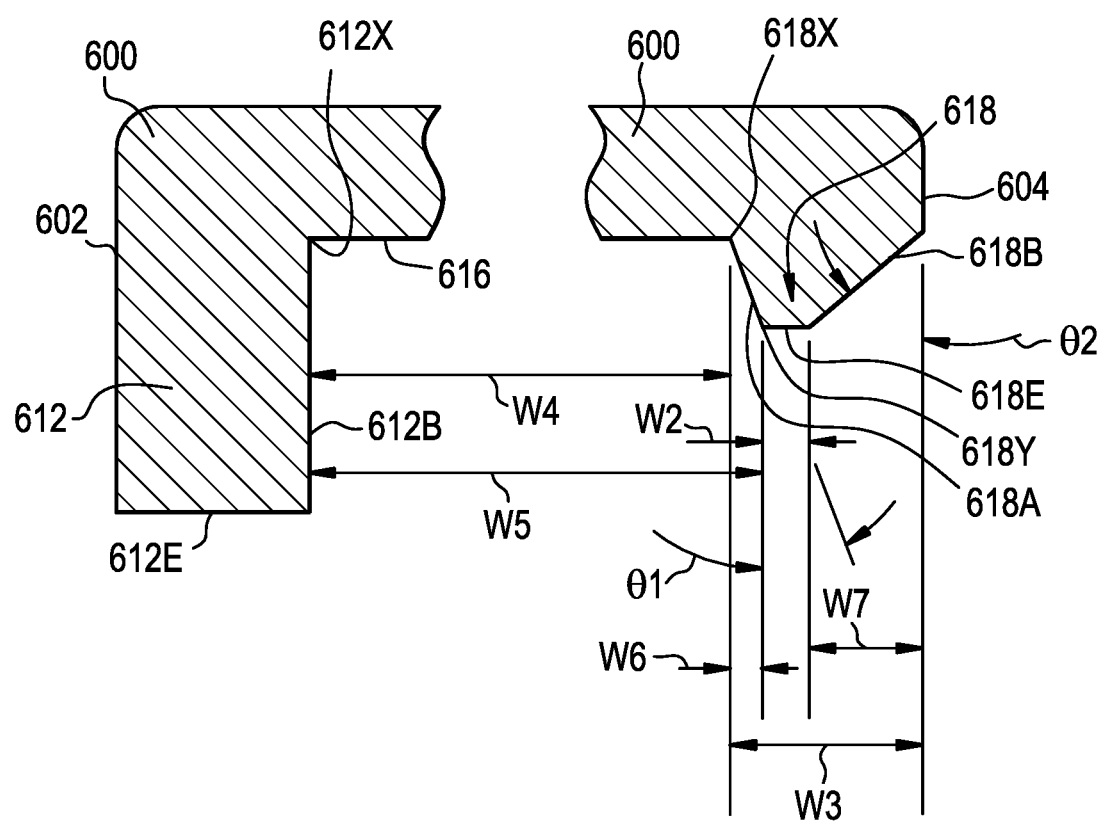
FIG. 15B is an enlarged and segmented view of a portion of the tire of FIG. 15A.

As shown in FIG. 15B, the angled abutment shoulder 618 has an outboard sloped abutment surface 618A that extends and slopes radially and axially inward from the interior surface 616 to the radially inward facing surface 618E. A portion of the outboard sloped abutment surface 618A abuts a portion of the inboard axial end 370B of the second outer ring 370. The outboard sloped abutment surface 618A is sloped at a first angle θ1 measured away from (e.g., axially inwardly away) a first radial line R3. In some embodiments, the first angle θ1 is between 0.5 degrees and 1.5 degrees. In some embodiments, the first angle θ1 is between 0.8 degrees and 1.2 degrees. In some embodiments, the first angle θ1 is between 0.9 degrees and 1.1 degrees. In some embodiments, the first angle θ1 is between 1.9 degrees and 2.0 degrees. In some embodiments, the first angle θ1 is between 0.5 degrees and 2.5 degrees. In some embodiments, the first angle θ1 is less than 5 degrees. The outboard sloped abutment surface 618A has an axial width W6.

As shown in FIG. 15B, the angled abutment shoulder 618 has an inboard sloped relief surface 618B that extends and sloped radially inward and axially outward from the inboard axial end 604 to the radially inward facing surface 618E. The inboard sloped relief surface 618B is sloped at a second angle θ2 measured away from (e.g., axially outwardly away) a second radial line R4. In some embodiments, the second angle θ2 is between about 40 degrees and 50 degrees. In some embodiments, the second angle θ2 is between about 50 degrees and 60 degrees. In some embodiments, the second angle θ2 is between about 30 degrees and 40 degrees. In some embodiments, the second angle θ2 is between about 30 degrees and 60 degrees. The inboard sloped relief surface 618B has an axial width W7. The inboard sloped relief surface 618B and the outboard sloped abutment surface 618A are sloped and extend axially toward each other such that the radially inward facing surface 618E has an axial width W2 that is less than an overall axial width W3 of the angled abutment shoulder 618.

As shown in FIG. 15B, the interior surface 616 has a first axial width W4 measured between: (1) a first junction 612X of the flange 612 and the interior surface 616; and (2) a second junction 618X of the angled abutment shoulder 618 and the interior surface 616. The tire 600 defines a second axial width W5 measured between: (1) an inboard surface 612B of the flange 612; and (2) a third junction 618Y between the outboard sloped abutment surface 618A and the radially inward facing surface 618E.

The outboard sloped abutment surface 618A has utility in reducing or eliminating axial movement of the first outer ring 340 and the second outer ring 370 relative to the tire 600 by a compensating feature for stack-up tolerances. When a combined axial width W1 of the first outer ring 340 and the second outer ring 370 is less than the axial width W5, the first outer ring 340 and the second outer ring 370 will still engage a portion of the outboard sloped abutment surface 618A to axially compress the first outer ring 340 and the second outer ring 370 between the outboard sloped abutment surface 618A and the inboard surface 612B. The swaged ridge 393 engages the first inner ring 350 to axially secure the first ball bearing 330 on the shaft 390 and the sloped abutment shoulder 618 engages the second outer ring 370 to axially secure the second ball bearing 360 to the tire 600. The second inner ring 380 abuts the shoulder 392A of the shaft 390 such that the first inner ring 350 and the second inner ring 380 are fixed relative to one another and fixed relative to the A axis along the shaft 390. The first ball bearing 330 and the second ball bearing 360 are located symmetrically on opposing sides of the apex R' of the cam follower crown radius R such that the first ball bearing 330 and the second ball bearing 360 axially abut one another under the apex R' to optimize load distribution. To accomplish this symmetry, the swaged ridge 393 and the sloped abutment shoulder 618 are positioned about the shaft 390 such that the swaged ridge 393 and the sloped abutment shoulder 618 are equidistant from the center axis B. This allows for equalization of load sharing by the first ball bearing 330 and the second ball bearing 360 for improved performance compared to prior art cam followers.

The sloped abutment shoulder 618 has utility in the installation by press fitting of the first outer ring 340 and the second outer ring 370 into the tire 600. For example, the radial length H4 is of a predetermined magnitude to allow radially outward deflection of the sloped abutment shoulder 618 to allow the first outer ring 340 and the second outer ring 370 to be pressed axially into the tire 600 without the need for special tools. The inboard sloped relief surface 618B and the axial width W7 thereof are configured to facilitate entry of the first outer ring 340 and the second outer ring 370 into the tire 600 and to provide sufficient support to maintain axial compression of the first outer ring 340 and the second outer ring 370 between the outboard sloped abutment surface 618A and the inboard surface 612B.

As shown in FIG. 13A, the shaft 390 includes a face 394 at the first axial end 391 perpendicular to the first axis of rotation A. The face 394 has a recessed hexagonal socket 395 (also referred to as a torque transmission aperture) configured to receive a hex wrench, or the like, for rotating the shaft 390 about the first axis of rotation A. As shown in FIG. 13B, the hexagonal socket 395 has a radially inward facing engagement surface 395A that is spaced apart from a radially innermost portion of an outboard axial surface 393A of the swaged ridge 393 by a neutral zone that extends a predetermined radial distance H1. In some embodiments, the radial distance H1 is about 25% of an outboard diameter D4 of the shaft 390 as measured at the first bore 351 of the first bearing 330 and the second bore 381 of the second bearing 360 (i.e. the outboard diameter D4 is the diameter of the outboard end 391 of the shaft 390 before the formation of the swaged ridge 393). This way, the neutral zone prevents deformation of the engagement surface 395A during formation of the swaged ridge 393, as discussed below. The shaft 390 further includes a plurality of threads 397 on a radial outside surface 397A of the shaft 390. In this way, the shaft 390 can be received in a bore (not shown) comprising a complementary thread pattern or can similarly be received in a nut or the like having a complementary thread pattern. In some embodiments, the shaft also includes a hollow portion 98 as discussed herein regarding FIG. 1B. This allows for weight reduction of shaft 390 for efficiency of operation, thus allowing additional mass of a tire 400, as described herein.

FIG. 13B shows the swaged ridge 393 as depicted in Detail B of FIG. 13A. The swaged ridge 393 has an outboard axial surface 393A that faces toward the first axial end 391 of the shaft 390. The outboard axial surface 393A extends radially outward from a first cylindrical surface 390A of the shaft 390 and terminates at a radially outward facing circumferential surface 393C. The swaged ridge 393 has an inboard axial surface 393B that faces toward the second axial end 396 of the shaft 390. The inboard axial surface 393B extends radially outward from a second cylindrical surface 390B of the shaft 390 and terminates at the radially outward facing circumferential surface 393C. The shaft 390 has a swage diameter D8 as measured at the radially outward facing circumferential surface 393C. In some embodiments, the swage diameter D8 is about 4% to about 6% larger than the outboard diameter D4. The outboard axial surface 393A is recessed axially inward from the first axial end 391 an axial distance D2. In some embodiments, the axial distance D2 is between 0.060 inches and 0.065 inches. In some embodiments, the axial distance D2 is about 0.063 inches. The outboard axial surface 393A is substantially flat and extends radially outward a radial distance H2 from the first cylindrical surface 390A. In some embodiments, the radial distance H2 is between 0.090 inches and 0.095 inches. In some embodiments, the radial distance H2 is about 0.094 inches. The inboard axial surface 393B is swaged against, conforms in shape to, and is compressed against the first inner ring 350 of the first bearing 330. Thus, depending on the shape of the first inner ring 350, the inboard axial surface 393B is substantially flat, arcuate, beveled, or the like. For example, in the embodiment shown in FIG. 13B, the inboard axial surface 393B is arcuate. The swaged ridge 393 retains the ball bearings 330, 360 on the shaft 390 such that an outboard axial surface 350A of the first inner ring 350 is positioned axially inward from the first axial end 391 of the shaft 390 an axial distance D3. In some embodiments, the axial distance D3 is about 10% of the combined axial width W1 of the ball bearings 330, 360, as shown in FIG. 13A. In some embodiments, the axial distance D3 is between 10% and 12% of the combined axial width W1 of the ball bearings 330, 360.

Figure 14A:
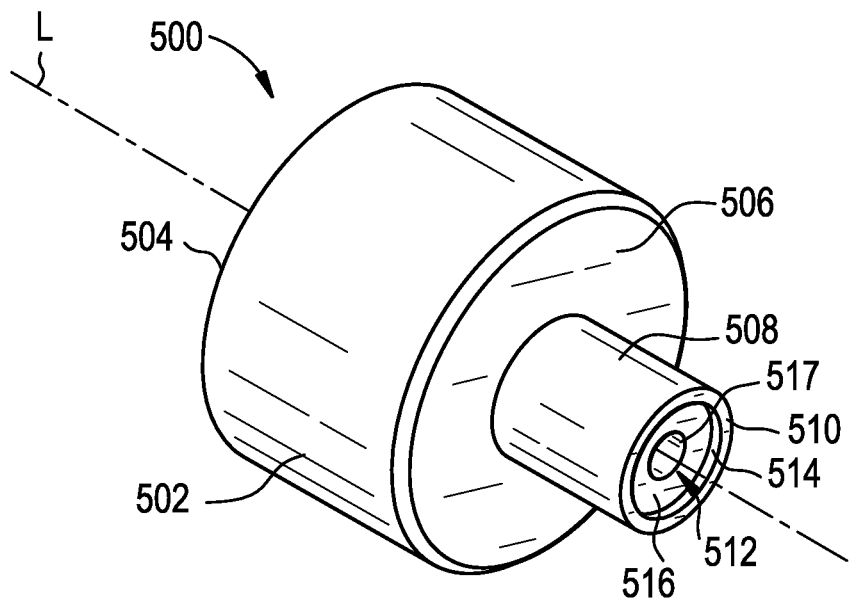
FIG. 14A is a perspective view of a swage die in accordance with one embodiment of the present invention.
Figure 14B:
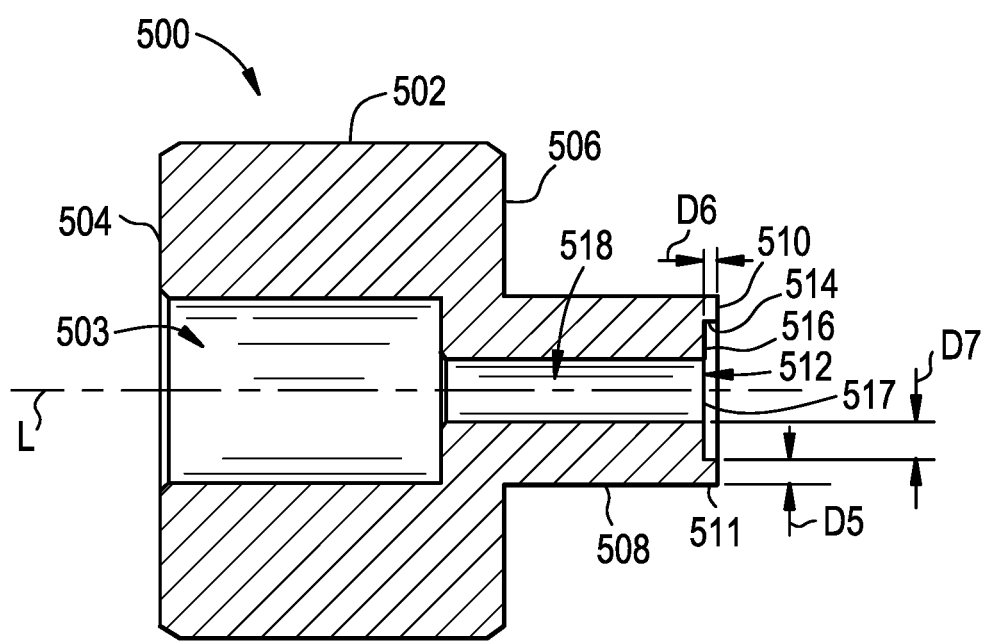
FIG. 14B is a cross-sectional view of the swage die of FIG. 14A.

FIGS. 14A-B show a swage die 500 according to an embodiment of the present invention. The swage die 500 is used in a process of forming the cam follower 310 of the axial retainment system 300 discussed herein regarding FIGS. 13A-B. The swage die 500 has a body 502 having a first end 504 and a second end 506 opposite the first end 504 along a longitudinal axis L. The first end 504 is mountable to a pressing device (e.g., a hydraulic press) via a bore 503 in the body 502. The swage die has a cylindrical extension 508 that extends outward from the second end 506 away from the first end 504 along the longitudinal axis L. The cylindrical extension 508 has an end face 510 having a cylindrical punch cavity 512 therein. The punch cavity 512 forms the swaged ridge 393 on the shaft 390 when the end face 510 of the swage die 500 engages and presses against the first axial end 391 of the shaft 390.

As shown in FIG. 14B, the punch cavity 512 is positioned radially inward a radial distance D5 from an outer edge 511 of end face 510. The radial distance D5 corresponds to the radial distance H2 of the outboard axial surface 393A of the swaged ridge 393. In some embodiments, the radial distance D5 is between 0.090 inches and 0.095 inches. In some embodiments, the radial distance D5 is about 0.094 inches. The punch cavity 512 has an interior wall 514 and a recessed surface 516. The recessed surface 516 is recessed an axial distance D6 from the end face 510. The axial distance D6 corresponds to the axial distance D2 of the outboard axial surface 393A of the swaged ridge 393. In some embodiments, the axial distance D6 is between 0.060 inches and 0.065 inches. In some embodiments, the axial distance D6 is about 0.063 inches. The cylindrical extension 508 has a hollow portion 518 extending inward from an opening 517 centrally located in the recessed surface 516. The opening 517 is positioned radially inward a radial distance D7 from the interior wall 514. The radial distance D7 corresponds to the radial distance H1 of the first axial end 391 of the shaft 390. In some embodiments, the radial distance D7 is about 25% of the outboard diameter D4. The opening 517 corresponds in size to the torque transmission aperture 395 of the shaft 390 to further prevent deformation of the engagement surface 395A during formation of the swaged ridge 393.

To form the swaged ridge 393 on the shaft 390, the first axial end 391 of the shaft 390 is inserted through the bore 381 of the second bearing 360 and the bore 351 of the first bearing 330 such that the second inner ring 380 abuts the shoulder 392A, the first inner ring 350 abuts the second inner ring 380, and the outboard axial surface 350A of the first inner ring 350 is positioned axially inward from the outboard end 391 of the shaft 390 the axial distance D3. The shaft 390 is secured in a fixture (not shown) with the first axial end 391 extending outwardly from the fixture. The punch cavity 512 of the swage die 500 is placed against the first axial end 391 of the shaft 390. The swage die 500 is pressed against the first axial end 391 of the shaft 390 to mechanically upset the material of the shaft 390 to form the swaged ridge 393 on the shaft 390 such that the swaged ridge 393 has the outboard axial surface 393A, the radially outward facing circumferential surface 393C, and the inboard axial surface 393B that conforms in shape to and compresses against the first inner ring 350, as discussed above. In some embodiments, a minimum pressing force of 5 tons is required to form the swaged ridge 393 on the shaft 390. As shown in FIG. 13A, the swaging process described herein permits the outboard end 391 of the shaft 390 to be flush with, or recessed within, the outboard end of the tire 400, which is required for successful operation of the flange forming station of a necker machine. The swaging process described herein also encourages the swaged material to flow radially outward (forming the swaged ridge 393) rather than both radially outward and radially inward because the swaged material flowing radially inward risks deforming the engagement surface 395A of the torque transmission aperture 395 and reducing the functionality of the torque transmission aperture 395.

A visual inspection system is used to verify that the swage diameter D8 is within an acceptable range (e.g., between about 4% to about 6% larger than the outboard diameter D4).

The inventors have surprisingly discovered that a visual inspection system can be used to differentiate between the subtle distinctions in color between adjacent surfaces to measure the swage diameter D8. For example, in some embodiments, the shaft 390 is treated with a black oxide process such that its steel surfaces have a chemical conversion coating formed thereon that appears black, and the ball bearing 330 is not treated with the black oxide process such that its steel surfaces have a lighter-colored appearance relative to the black oxide coated shaft 390 (such as a gray-colored appearance) such that the visual inspection system scans the outboard face 394 and differentiates between the black-colored radially outward facing circumferential surface 393C of the swaged ridge 393 and the lighter-colored gray outboard axial surface 350A of the first inner ring 350 to measure the swage diameter D8. In some embodiments, the material of the shaft 390 displaced during the swaging process to form the swaged ridge 393 is discolored from its engagement with the swage die 500 and has a darker (almost black) appearance relative to the non-swaged lighter-colored machined material of the ball bearing 330 such that the visual inspection system scans the outboard face 394 and differentiates between the subtle color distinctions between the radially outward facing circumferential surface 393C and the inner ring 350 to measure the swage diameter D8. In some embodiments, a method of visually inspecting the shaft 390 is used to confirm the swage diameter D8 is within the acceptable range of about 4% to about 6% larger than the outboard diameter D4. The method includes a visual inspection system configured to scan a face of an object, differentiate between at least two contrasting colors of at least two adjacent surfaces of the object, and measure a distance along the face of the object. The method uses the visual inspection system to scan the first axial end 391 of the shaft 390, differentiate between a first color of the swaged ridge 393 and a second contrasting color of the first bearing 330, and measure the swage diameter D8 of the swaged ridge 393 at the radially outward facing circumferential surface 393C. In some embodiments, the first color of the swaged ridge 393 is darker relative to the second contrasting color of the first bearing 330.

The first ball bearing 330 and the second ball bearing 360 are received in the tire 400 or the tire 600. In some embodiments, the tires 400, 600 are made from a metallic material. In one embodiment, the tires 400, 600 are made from steel. In a particular embodiment, the tires 400, 600 are made from carburized steel and includes an optional black oxide coating for maximum wear resistance. It should be appreciated that in alternate embodiments different tire materials and different tire sizes are used for the tires 400, 600. Further, the cam follower 310 is versatile in that in some embodiments the tires 400, 600 are interchangeable with, for example, tires made of other metallic materials and tires made from elastomers, polymers or combinations thereof. The tires 400, 600 each have an exterior surface 410, 610, which includes a crown radius R and an apex R'. The crown radius R is bowed about the center axis B, which is substantially perpendicular to axis A. The tires 400, 600 each include a flange 412, 612. The flanges 412, 612, in cooperation with an axial retainment feature, such as the clip 420 disposed in the groove 418 of tire 400 or the angled abutment shoulder 618 of tire 600, axially secure the first outer ring 340 and the second outer ring 370 to the tires 400, 600 such that the tires 400, 600 are axially fixed to the first ball bearing 330 and the second ball bearing 360. As shown in FIG. 13A, tire 400 has a thickness T1. The exterior surfaces 410, 610 of the tires 400, 600 engage the cam (not shown) during operating of the necker in accordance with the present invention.

A pitch radius PR is defined as the distance between the midpoint C of any one of the first plurality of rolling elements 354 and the axis A as shown in FIG. 13A. The pitch radius PR is also defined as the distance between the midpoint of any one of the second plurality of rolling elements 384 and the axis A as shown in FIG. 13A. The ratio of the thickness T1 of the tire 400 to the pitch radius PR (i.e., T1 divided by PR) is between about 0.18 and about 0.19. Further, the ratio of the depth D1 of the groove 418 (that the clip 420 is disposed in) to the thickness T1 of the tire 400 (i.e., D1 divided by T1) is between about 0.17 and about 0.19. The outboard radial height H2 of the radially outward facing circumferential surface 393C of the swaged ridge 393 are sized to provide a sufficient thickness of material to withstand axial forces and to axially retain the first outer ring 340 and the second outer ring 370 at a fixed axial position on the shaft 390 while allowing the first outer ring 340 and the second outer ring 370 to rotate around the shaft 390. The about 0.17 to about 0.19 ratio of the depth D1 of the groove 418 to the tire thickness T1 also allows for minimization of the weight of the (e.g. metallic) tire 400 while maintaining sufficient material thickness of the tire 400 to meet strength and wear requirements for the tire 400. In some embodiments, the depth D1 of the groove 418 is determined by the length of the clip 420 such that the ratio of the depth D1 to the tire thickness T1 is smaller or larger than the about 0.17 to about 0.19 range discussed above.

In reference to FIGS. 3 and 4, a ram assembly 200 for a necker machine (not shown) in accordance with the present invention is shown. In such a can making necker machine, a cam follower rides on a rotating cam 260 with the rotational axis $A_C$ parallel to the surface of the cam 260. The ram assembly 200 extends between a first axial end 210 and a second axial end 230. The ram assembly 200 includes a fixed bushing 220 having a bore extending therethrough between the first axial end 210 and the second axial end 230. A ram piston 214 extends through both ends of the bore of the fixed bushing 220. Proximate to the second axial end of the ram 230, two cam followers (similar to the cam follower 310 illustrated in FIGS. 13A-B and described in detail herein) extend radially therefrom. Referring to FIG. 4, the cam followers 310, including a first roller 240 and a second roller 250, ride on a surface of a cam 260, with one roller 240, 250 located on each side of the cam 260, as the rollers rotate around the rotational axis of the cam $A_C$. The ram 214 is moved back and forth along the axis AR by the attached rollers 240, 250 in an accelerating and decelerating movement following a profile of the cam 260. Considerable radial force (i.e., force along the cam radial axis $R_C$) is developed on the rollers 240, 250 during the can necking operation.

Selection of the spherical ball (e.g. 354, 384) geometry for optimum service life via computer modeling of the bearing design was performed utilizing the load duty cycle of the necker machine as input. Necker machines can run 24 hours a day, 7 days a week and can process from about 2700 cans per minute to about 3000 cans per minute. Due to the unique geometry and corresponding efficiency, the instant cam follower design accommodates higher outputs of up to about 3350 cans per minute.

The geometry of the first ball bearing 330 and the second ball bearing 360 is selected to yield maximum load capacity and to allow the end user to stipulate the outer diameter of the tire 400, as previously discussed. Specifically, the geometry of the rolling elements 354, 384, the inner rings 350, 380, and the outer rings 340, 370 are adjusted to minimize the internal clearance C1, C2 in the respective bearing 330, 360 thereby optimizing load distribution and service life, as discussed herein regarding FIG. 1D, which is also representative of the first bearing 330 and the second bearing 360 as discussed herein regarding FIG. 13A. Press fitting the interior surface 416 of the tire 400 over the outer rings 340, 370 adjusts the internal clearance C1, C2. Generally, ball bearings have an industry standard internal clearance or looseness, which is reduced by the interference press fit of the outer rings 340, 370 into the tire 400. By reducing this internal clearance C1, C2, more rolling elements 354, 384 within each bearing 330, 360 share the applied load, thereby increasing and optimizing the bearing life. In some embodiments, the internal clearance is between 0.0002 inches and 0.0008 inches. The applied load per duty cycle is discussed above with regards to FIGS. 5-7, which are also representative of the cam follower 310 discussed herein regarding FIG. 13A. A radial distance R1 is defined by the radial distance from the exterior surfaces 344, 374 of the outer rings 340, 370 to the shaft axis A. A radial distance R2 is defined by the radial distance from shaft axis A to an interior surface 416 of the tire 400. The ratio of R1 to R2 is adjusted to optimize the load distribution. By maintaining a R1:R2 ratio between about 1.000 and about 1.015, improved load sharing and longer bearing life is realized.

The design of the ball bearings disclosed herein adjusts the aforementioned internal clearance for optimum load distribution and service life. In some embodiments, the interference press fit into the cam follower wheel ranges from 0.0003 inches to 0.0013 inches of interference fit, resulting in an internal clearance at or near 0.0002 inches.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An axial retainment system for a shaft, the axial retainment system comprising:
   the shaft extending from an outboard end to an inboard end;
   a flange disposed between the outboard end and the inboard end; and
   a protrusion extending radially outward from the shaft proximate the outboard end and terminating at a radially outward facing circumferential surface, the protrusion and the flange configured to axially retain a first bearing ring therebetween;
   wherein the protrusion and the first bearing ring have different colors.

2. The axial retainment system of claim 1, wherein the protrusion is defined by a first cylindrical surface extending axially inward from the outboard end and an outboard axial surface extending radially outward from the first cylindrical surface such that the outboard axial surface is recessed axially inward from the outboard end, the outboard axial surface extending radially to the radially outward facing circumferential surface.

3. The axial retainment system of claim 2, wherein the outboard axial surface is substantially flat.

4. The axial retainment system of claim 2, wherein the outboard end comprises a torque transmission aperture extending axially inward therefrom, the torque transmission aperture having a radially inward facing engagement surface, wherein the first cylindrical axial surface is spaced apart from the engagement surface by a neutral zone that extends a predetermined radial distance from the engagement surface to the first cylindrical surface, to prevent deformation of the engagement surface when forming the protrusion.

5. The axial retainment system of claim 1, wherein the protrusion is formed by swaging.

6. The axial retainment system of claim 5, wherein the protrusion is swaged to produce an inboard axial surface that is compressed against and conforms in shape to the first bearing ring.

7. The axial retainment system of claim 6, wherein the inboard axial surface is curved.

8. The axial retainment system of claim 1, wherein the first bearing ring includes an inner bearing diameter where the first bearing ring is attached to the shaft, wherein a protrusion diameter extending from an axial center axis of the shaft to the radially outward facing circumferential surface of the protrusion is greater than the inner bearing diameter where the first bearing ring is attached to the shaft.

9. The axial retainment system of claim 8, wherein the protrusion diameter is approximately 4% to 6% greater than the inner bearing diameter.

10. The axial retainment system of claim 1, wherein the flange has a shoulder extending axially outward toward the outboard end on an outboard axial surface of the flange.

11. The axial retainment system of claim 10, further comprising a second bearing ring, the second bearing ring disposed against the outboard axial surface of the flange.

12. The axial retainment system of claim 1, wherein the first bearing ring is an inner ring of a ball bearing, the ball bearing further comprising an outer ring and a plurality of rolling elements disposed between the inner and outer rings.

13. A cam follower comprising:
a shaft extending from an outboard end to an inboard end and having a first bearing ring disposed thereon;
wherein the shaft has an outboard diameter as measured from an axial center axis of the shaft where the first bearing ring is disposed thereon;
a flange radially extending from the shaft and disposed between the outboard end and the inboard end; and
a swaged ridge extending radially outward from the shaft proximate the outboard end and terminating at a radially outward facing circumferential surface, the swaged ridge and flange configured to axially retain the first bearing ring therebetween;
wherein the swaged ridge is defined by a first cylindrical surface extending axially inward from the outboard end and an outboard axial surface extending radially outward from the first cylindrical surface, the outboard axial surface extending radially from the first cylindrical surface to the radially outward facing circumferential surface;
wherein the outboard end comprises a torque transmission aperture extending axially inward therefrom, the torque transmission aperture having a radially inward facing engagement surface, wherein the first cylindrical surface is spaced apart from the engagement surface by a neutral zone that extends a predetermined radial distance from the engagement surface to the first cylindrical surface, to prevent deformation of the engagement surface when forming the swaged ridge; and
wherein the predetermined radial distance is approximately 25% of the outboard diameter.

14. The cam follower of claim 13, wherein the first bearing ring is an inner ring of a rolling element bearing, the rolling element bearing further comprising:
an outer ring having an outer ring bearing surface and an exterior surface; and
a plurality of rolling elements disposed in an annular cavity between the inner and outer rings of the rolling element bearing.

15. The cam follower of claim 14, wherein:
the outer ring is received in a tire,
the tire has a thickness and a crown radius,
the crown radius has an apex,
the inner ring and the outer ring are axially centered with respect to the apex,
a composition of the tire comprises at least one of a metallic material, a plastic material, and a non-metallic material,
the tire has a groove formed therein, extending radially outward and extending circumferentially therearound, and
a clip disposed at a depth in the groove.

16. The cam follower of claim 15, wherein a ratio of the depth to the thickness is between 0.17 and 0.19.

17. The cam follower of claim 15, wherein a first distance is defined between an exterior surface of the outer ring and axial center axis of the shaft, and a second distance is defined between the axial center axis of the shaft and an interior surface of the tire, wherein a ratio of the first distance to the second distance is between 1.000 and 1.015.

18. The cam follower of claim 14, wherein the plurality of rolling elements is a plurality of spherical balls.

19. The cam follower of claim 14, wherein the cam follower has a duty cycle, a bearing load capacity being selected based on the duty cycle.

20. The cam follower of claim 13, wherein the swaged ridge is formed by swaging the outboard end of the shaft with a swage die, the swage die comprising a body having a first end configured to be mounted to a pressing device and a second end opposite the first end, the second end having a cylindrical extension extending from the second end away from the first end, the cylindrical extension having an end surface with a cylindrical punch cavity therein configured to engage and swage the outboard end of the shaft.

21. The cam follower of claim 13, wherein the swaged ridge is swaged to produce an inboard axial surface that is compressed against and conforms in shape to the first bearing ring.

22. The cam follower of claim 21, wherein the outboard axial surface of the swaged ridge is recessed axially inward from the outboard end of the shaft.

23. The cam follower of claim 21, wherein the outboard axial surface of the swaged ridge is substantially flat.

24. The cam follower of claim 21, wherein the inboard axial surface is arcuate.

25. The cam follower of claim 21, wherein the first bearing ring is axially retained and compressed between the flange and the inboard axial surface of the swaged ridge.

26. A cam follower comprising:
a shaft extending from an outboard end to an inboard end;
a first bearing ring and a second bearing ring disposed on the shaft;
a flange radially extending from the shaft and disposed between the outboard end and the inboard end; and a swaged ridge extending radially outward from the shaft proximate the outboard end and terminating at a radially outward facing circumferential surface, the swaged ridge and the flange configured to axially retain the first and second bearing rings therebetween;

wherein the swaged ridge is defined by a first cylindrical surface extending axially inward from the outboard end and an outboard axial surface extending radially outward from the first cylindrical surface, the outboard axial surface extending radially from the first cylindrical surface to the radially outward facing circumferential surface;

wherein the swaged ridge separates the first bearing ring from the outboard end by an axial distance;

wherein the axial distance is less than 12% of a combined axial width of the first and second bearing rings.

27. The cam follower of claim 26, wherein:
the first bearing ring is a first inner ring of a first ball bearing, the first ball bearing comprising a first outer ring, the first ball bearing having a first plurality of rolling elements disposed between the first inner ring and the first outer ring;
the second bearing ring is a second inner ring of a second ball bearing, the second ball bearing comprising a second outer ring, the second ball bearing having a second plurality of rolling elements disposed between the second inner ring and the second outer ring; and
the cam follower further comprises: a tire defining an interior area, the first and second outer rings extending at least partially into the interior area of the tire, the tire having a flange extending radially inward from a first axial end of the tire proximate the outboard of the shaft and an axial retainment feature at a second axial end of the tire.

28. The cam follower of claim 27, further comprising:
a first seal extending radially between the first inner ring and the first outer ring;
a second seal extending between the first inner ring and the first outer ring;
a third seal extending between the second inner ring and the second outer ring; and
a fourth seal extending between the second inner ring and the second outer ring proximate to the axial retainment feature;
wherein the second seal and the first seal sealing a first lubricant therebetween and the third seal and the fourth seal sealing a second lubricant therebetween.

29. The cam follower of claim 27, wherein the flange of the tire extends radially inward from the first axial end of the tire a first radial distance, and the axial retainment feature comprises an angled abutment shoulder extending radially inward from the second axial end of the tire a second radial distance, the second radial distance being less than the first radial distance.

30. The cam follower of claim 29, wherein the angled abutment shoulder comprises an outboard sloped abutment surface extending radially and axially inward from an interior surface of the tire to a radially inward facing surface of the angled abutment shoulder, and an inboard sloped relief surface extending radially inward and axially outward from the second axial end of the tire to the radially inward facing surface of the angled abutment shoulder.

31. The cam follower of claim 27, wherein the axial retainment feature comprises a groove extending radially outward at the second axial end of the tire.

32. The cam follower of claim 31, wherein:
a clip is disposed at a depth in the groove;
the tire has a thickness and a crown radius,
the crown radius has an apex,
the first inner ring and the second inner ring are axially centered with respect to the apex,
a composition of the tire includes at least one of a metallic material, a plastic material, and a non-metallic material, and combinations thereof.

33. The cam follower of claim 32, wherein a ratio of the depth to the thickness is between 0.17 and 0.19.

34. The cam follower of claim 31, wherein a ratio of thickness to a pitch radius of at least one of the bearings is between 0.18 and 0.19.

35. The cam follower of claim 27, further comprising a first distance defined between an exterior surface of the first outer ring and a shaft axis, and a second distance defined between the shaft axis and an interior surface of the tire; wherein a ratio of the first distance to the second distance is between 1.000 and 1.015.

36. The cam follower of claim 26, wherein the shaft includes a hollow portion.

37. The cam follower of claim 26, wherein the swaged ridge is swaged to produce an inboard axial surface that is compressed against and conforms in shape to the first bearing ring.

38. The cam follower of claim 37, wherein the outboard axial surface of the swaged ridge is recessed axially inward from the outboard end of the shaft.

39. The cam follower of claim 37, wherein the first outboard surface of the swaged ridge is substantially flat.

40. The cam follower of claim 37, wherein the outboard end of the shaft comprises a torque transmission aperture extending axially inward therefrom, the torque transmission aperture having a radially inward facing engagement surface, and wherein the first cylindrical surface of the swaged ridge is spaced apart from the engagement surface by a neutral zone that extends a predetermined radial distance from the engagement surface to to prevent deformation of the engagement surface when forming the swaged ridge.

41. The cam follower of claim 37, wherein the inboard axial surface of the swaged ridge is arcuate.

42. A ram piston for a necker machine comprising a first cam follower of claim 31 and a second cam follower of claim 26.

43. The ram piston of claim 42, wherein the first cam follower has a first duty cycle, a first bearing loading capacity being selected based on the first duty cycle.

44. The ram piston of claim 42, wherein the second cam follower has a second duty cycle, a second bearing loading capacity being selected based on the second duty cycle.

45. A method of assembling a cam follower, the method comprising the steps of:
providing a shaft extending from a first axial end to a second axial end thereof, the shaft having a circumferential shoulder extending radially outward from the shaft and being located between the first axial end and the second axial end;
providing at least one bearing, the at least one bearing having an inner ring defining a bore, an outer ring coaxially disposed on the inner ring, and a plurality of rolling elements disposed between the inner ring and the outer ring;
providing a swage die comprising a body having a first end configured to be mounted to a pressing device and a second end opposite the first end, the second end having a cylindrical extension extending from the second end away from the first end, the cylindrical extension having an end surface with a cylindrical punch cavity therein;

inserting the first axial end of the shaft through the bore of the at least one bearing;

positioning the at least one bearing on the shaft such that a first axial end of the inner ring abuts the circumferential shoulder of the shaft;

securing the shaft in a fixture with the first axial end extending outwardly from the fixture;

placing the punch cavity of the swage die on the first axial end of the shaft;

pressing the swage die against the first axial end of the shaft; and swaging a swaged ridge on the shaft with the swage die, the swaged ridge extending radially outward from the shaft at the first axial end of the shaft, the swaged ridge having a first axial surface facing toward the first axial end of the shaft and extending radially outward and terminating at a radially outward facing circumferential surface, the swaged ridge having a second axial surface facing toward the shoulder of the shaft and extending radially outward and terminating at the radially outward facing circumferential surface, the second axial surface of the swaged ridge conforms in shape to and compresses against a second axial end of the inner ring;

wherein the swaged ridge axially retains the inner ring on the shaft between the swaged ridge and the shoulder.

46. The method of claim 45, further comprising the steps of:

providing a tire, the tire having a flange extending radially inward from a first axial end of the tire and a groove extending radially outward at a second axial end of the tire;

providing a clip;

securing the tire to the outer ring of the at least one bearing such that a first axial end of the outer ring abuts the flange; and inserting the clip into the groove of the tire such that a second axial end of the outer ring abuts the clip.

47. The method of claim 45, further comprising the steps of:

providing a tire, the tire having a flange extending radially inward from a first axial end of the tire and an angled abutment shoulder extending radially inward from a second axial end of the tire; and securing the tire to the outer ring of the at least one bearing such that a first axial end of the outer ring abuts the flange and a second axial end of the outer ring abuts the angled abutment shoulder, wherein the angled abutment shoulder comprises an outboard sloped abutment surface extending radially and axially inward from an interior surface of the tire to a radially inward facing surface of the angled abutment shoulder, and an inboard sloped relief surface extending radially inward and axially outward from the second axial end of the tire to the radially inward facing surface of the angled abutment shoulder.

48. The method of claim 45, further comprising performing a visual inspection of the swaged ridge to determine that the swaged ridge has a swage diameter as measured at the radially outward facing circumferential surface, the swage diameter being about 4% to about 6% greater than an outboard diameter of the shaft as measured at the at least one bearing.

49. A method of visually inspecting a cam follower, the method comprising the steps of:

providing a shaft extending from a first axial end to a second axial end thereof, the shaft having a swaged ridge extending radially and circumferentially outward from the shaft and being located proximate the first axial end, the shaft having a bearing positioned thereon such that a first axial end of the bearing abuts the swaged ridge, the swaged ridge having a first color and the bearing having a second contrasting color;

scanning the first axial end of the shaft;

differentiating between the first color of the swaged ridge and the second contrasting color of the bearing; and measuring a swage diameter of the swaged ridge at a radially outward facing circumferential surface thereof.

50. The method of claim 49, further comprising confirming that the swage diameter is about 4% to about 6% greater than an outboard diameter of the shaft as measured at the bearing.

51. The method of claim 49, wherein the first color of the swaged ridge is darker relative to the second contrasting color of the bearing.

* * * * *

UNITED STATES PATENT AND TRADEMARK OFFICE
CERTIFICATE OF CORRECTION

| | | |
|---|---|---|
| PATENT NO. | : 11,674,584 B2 | Page 1 of 1 |
| APPLICATION NO. | : 17/190012 | |
| DATED | : June 13, 2023 | |
| INVENTOR(S) | : Robert Pallini et al. | |

It is certified that error appears in the above-identified patent and that said Letters Patent is hereby corrected as shown below:

In the Claims

Claim 39
Column 32, Lines 28-29: Please delete "first outboard surface" and insert --outboard axial surface--.

Claim 40
Column 32, Line 37: After "engagement surface to", please insert --the first cylindrical surface--.

Signed and Sealed this
Twenty-second Day of August, 2023

*Katherine Kelly Vidal*

Katherine Kelly Vidal
*Director of the United States Patent and Trademark Office*